(12) United States Patent
Imada et al.

(10) Patent No.: US 6,268,983 B1
(45) Date of Patent: *Jul. 31, 2001

(54) HEAD ACTUATOR DRIVEN BY PIEZOELECTRIC ELEMENT

(75) Inventors: Katsumi Imada, Katano; Tetsuro Otsuchi, Osaka; Katsunori Moritoki, Takatsuki; Osamu Kawasaki, Kyotanabe, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/221,071

(22) Filed: Dec. 28, 1998

(30) Foreign Application Priority Data

Dec. 25, 1997 (JP) ........................................ 9-357062

(51) Int. Cl.[7] ........................................ G11B 5/127
(52) U.S. Cl. ........................................ 360/294.3; 360/294.4
(58) Field of Search ........................................ 360/104, 109, 360/294.1–294.6, 274

(56) References Cited

U.S. PATENT DOCUMENTS

| | | | |
|---|---|---|---|
| 5,189,578 | * | 2/1993 | Mori ........................................ 360/109 |
| 5,521,778 | * | 5/1996 | Boutaghou ........................................ 360/109 |
| 5,781,381 | * | 7/1998 | Koganezawa ........................................ 360/109 |
| 6,108,175 | * | 8/2000 | Hawwa ........................................ 360/294.4 |
| 6,201,668 | * | 3/2001 | Murphy ........................................ 360/294.4 |

FOREIGN PATENT DOCUMENTS

| | | | |
|---|---|---|---|
| 4-134681 | * | 8/1992 | (JP) ........................................ 360/294.4 |
| 5-47126 | | 2/1993 | (JP) . |
| 9-265738 | | 10/1997 | (JP) . |

* cited by examiner

Primary Examiner—A. J. Heinz
(74) Attorney, Agent, or Firm—Ratner & Prestia

(57) ABSTRACT

A head actuator mechanism characterized has a head that records and reproduces data; a suspension that holds the head; a support arm; a drive means for moving the support arm; a coupling section for coupling the support arm and the suspension together in such a way that the head can move relatively to the support arm; and at least one piezoelectric element for coupling the support arm and the suspension together to move the head relatively to the support arm for fine tuning, the piezoelectric element being fixed to the support arm and suspension at both ends.

50 Claims, 37 Drawing Sheets

Prior to the application of electric fields

After the application of electric fields

Track direction

Track direction

HEAD ACTUATOR DRIVEN BY PIEZOELECTRIC ELEMENT

BACKGROUND OF THE INVENTION

1. Field of the Invention

The present invention relates to a head actuator mechanism used for a disc apparatus such as a hard disc apparatus using a disc as an information storage medium.

2. Related Art of the Invention

Magnetic disc apparatuses such as hard disc and floppy disc apparatuses conventionally use the same magnetic head to write and read data. On the contrary, attention is being paid to the application to magnetic disc apparatuses of very sensitive read-only heads using a magnetic-resistance effect element (MR elements), including so-called magnetic-resistance magnetic heads. Of course, the use of such a read-only head requires a separate write-only magnetic head to be provided.

FIG. 40 shows an example of such a magnetic head formed by integrating a write and a read elements as a thin-film structure. This is a head based on a "piggyback" method which is constituted by laminating an MR element 22 acting as a read element and a lead conductor 23 connected to the MR element, via an insulating layer 21 on a head slider 20, and laminating thereon via an insulating layer 24 a write element comprising a lower and an upper cores 25 and 26 and a write gap 27 and a coil conductor 28 provided between the cores. The magnetic head is disposed so as to be opposed to the magnetic disc 29 as shown in the figure.

Currently, instead of the linear motor method, the rotary actuator method enabling the magnetic head to be moved at a high speed using a small apparatus is often used as a method for driving the magnetic head in the magnetic disc apparatus. As shown in FIG. 41, this method uses a rotating shaft 32 as a support point to rotate an arm 31 with a magnetic head 30 attached to its tip in order to move the magnetic head 30 in the radial direction between the inner and outer circumferences of the magnetic disc 29 for seeking. According to this method, the relative angle between the track direction and the magnetic head 30 is not constant in each track. In other words, the azimuth angle (between the gap direction and track width direction of the magnetic head 30) of the magnetic head 30 varies with the track. If the magnetic head 30 is used for both writes and reads, no problem occurs even if the relative angle between the track direction and the magnetic head varies with the track.

If, however, the magnetic head 30 comprises the individually configured write and read elements arranged on the same slider in parallel as shown in FIG. 40 and the relative angle varies with the track, the trace position may be different for a write element 40 and a read element 41 laminated as shown in FIG. 42. FIG. 42 shows a difference in the trace position for the write and read elements 40 and 41 caused by the difference in the relative angle between the track direction and the magnetic head. As shown in FIG. 42(a), when the relative angle between the track direction and the write and read elements 40 and 41 is 90° (corresponding to the azimuth angle of 0°), the write and read elements 40 and 41 trace the same position (shown by arrow 43) in the same track 42. On the contrary, if the relative angle between the track direction and the write and read elements 40 and 41 becomes different from 90°, for example, the track 44 is displaced toward the outer circumference relative to the state in FIG. 42(a), as shown in FIG. 42(b), the write element 40 traces the position shown by arrow 45, while the read element 41 the position shown by arrow 46 which is slightly closer to the inner circumference, resulting in a difference in traced track 44 position (this is called a "track offset") between writes and reads. Consequently, the read output from the read element 41 decreases in such a way as to correspond to the rate of track offset relative to the track width. The decrease in read output caused by the track offset increases with decreasing track width due to the increasing density of the track, causing an increase in error rate.

As described above, when a magnetic head comprising a write and a read elements that are individually configured is driven by a rotary actuator as in the prior art, the track offset may occur between writes and reads to reduce the read output.

This invention is provided in view of this point, and its object is to provide a magnetic disc apparatus that prevents the track offset between writes and reads even if a magnetic head comprising a write and a read elements that are individually configured is driven by a rotary actuator.

SUMMARY OF THE INVENTION

A head actuator mechanism of the present invention has:
a head that records and reproduces data;
a suspension that holds the head;
a support arm;
a drive means for moving the support arm;
a coupling section for coupling said support arm and said suspension together in such a way that said head can move relatively to said support arm; and
at least one piezoelectric element for coupling said support arm and said suspension together to move said head relatively to said support arm for fine tuning,
said piezoelectric element being fixed to said support arm and suspension at both ends.

And the head actuator mechanism according to the above invention is such that said coupling section is another piezoelectric element both ends of which are fixed to said support arm and said suspension.

And the head actuator mechanism according to the above invention is such said coupling section is present on the side of the position at which said piezoelectric element is coupled to said support arm.

And the head actuator mechanism according to the above invention is such that said coupling section is present on the side of the position at which said piezoelectric element is coupled to said suspension.

BRIEF DESCRIPTION OF THE DRAWINGS

FIG. 31 is a top view showing a configuration of an eighth embodiment of this invention;

DESCRIPTION OF SYMBOLS

Figure 1:
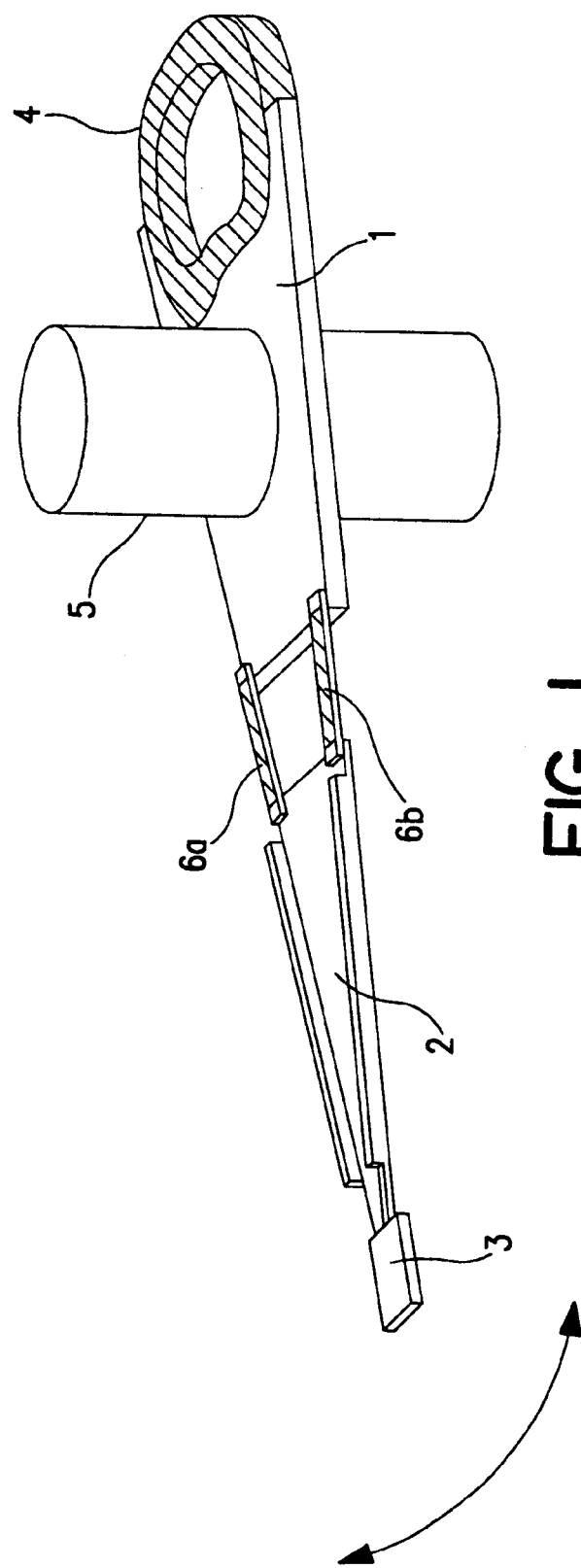
FIG. 1 is a perspective view showing a configuration of a first embodiment of this invention.

1 Support arm
2 Suspension
3 Head
4 Coil or the voice coil motors (VCM)
5 Shaft and Bearing
6a, 6b, 6c, 6d Piezoelectric elements consisting of piezoelectric bodies
7, 7a, 7b Hinge composed of an elastic bodies
8a, 8b, 8c, 8d Element-fixing hinges
9a Driving electrode
9b Detection electrode
10 Signal generating circuit
11 Amplifier
12 Control circuit
13a, 13b, 13c, 13d, 13e, 13f Actuator body blocks
14a, 14b, 14c, 14d Reinforcing materials
15a, 15b, 15c, 15d hinge substitution sections
16 Shaft plate
17a, 17b Piezoelectric bodies
18a, 18b Joining members

DETAILED DESCRIPTION OF THE PREFERRED EMBODIMENTS

First Embodiment

A first embodiment of this invention is described below with reference to the drawings.

Figure 2:
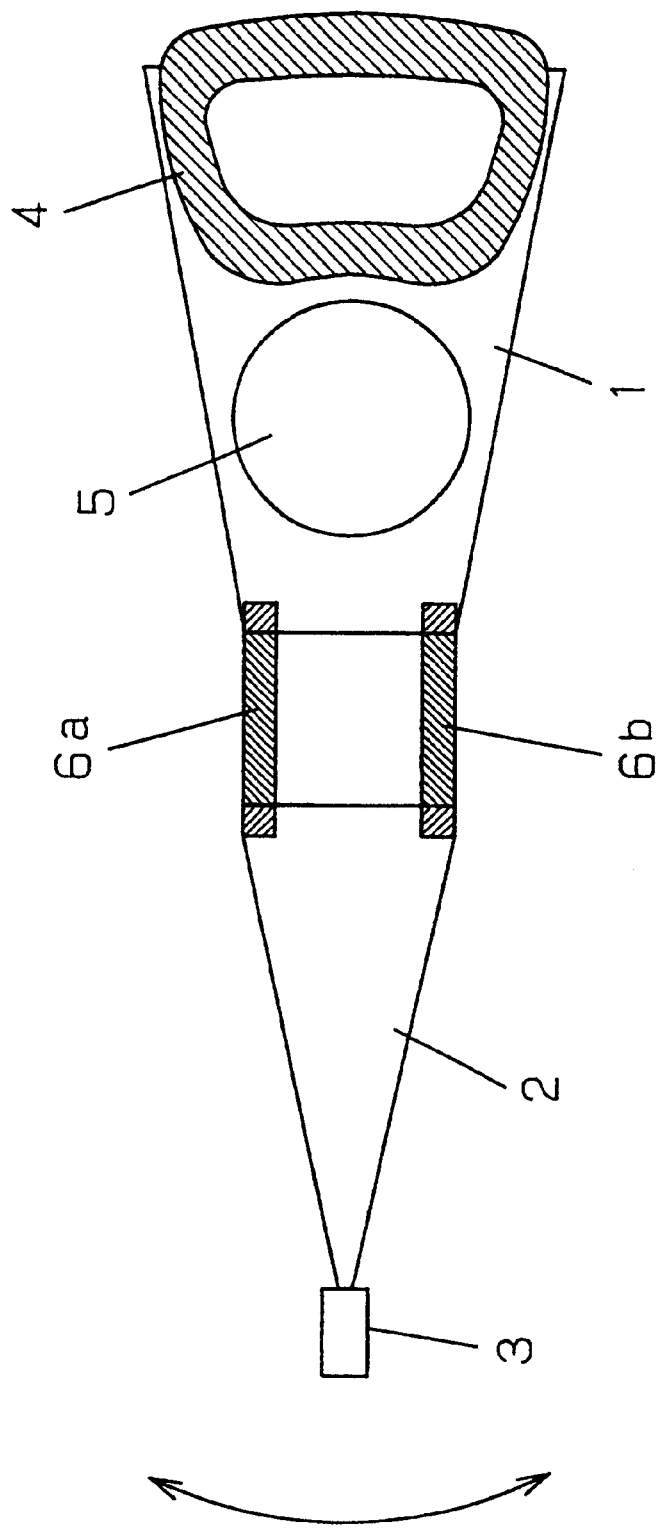
FIG. 2 is a top view showing a configuration of a first embodiment of this invention.

FIG. 1 is a perspective view of a head actuator mechanism according to the first embodiment of this invention. FIG. 2 is a top view of the head actuator mechanism according to the first embodiment of this invention. The present head actuator is composed of a coarse-motion actuator and a fine-motion actuator each consisting of a voice coil motors.

In the figures, 1 is a support arm, 2 is a suspension, 3 is head, 4 is a coil for the voice coil motors (VCM), 5 is a shaft and a bearing, and 6a and 6b are piezoelectric elements consisting of piezoelectric bodies each having one end fixed to the support arm 1 and the other end connected to the suspension 2 using an adhesive, respectively. The piezoelectric elements 6a and 6b are polarized in the same thickness direction, and electrodes are formed in part of the front and rear surfaces of the element so that the stretching vibration of the piezoelectric elements 6a and 6b is excited in the longitudinal direction when electric fields are applied to the electrodes in the front and rear surfaces.

Although this embodiment defines the polarization direction of the piezoelectric elements, the stretching direction of the elements is actually determined by the relationship between the direction of polarization and the direction of applied electric fields. Thus, it is sufficient to apply electric fields in an appropriate direction taking the direction of polarization during the driving into consideration.

Figure 3A:
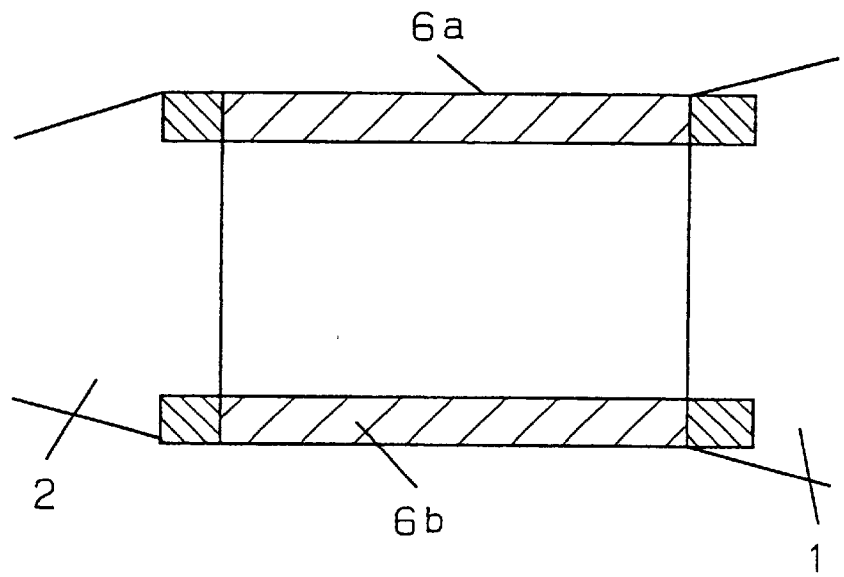
FIG. 3(a) shows the periphery of a fine-motion actuator according to the first embodiment (prior to the application of electric fields)
Figure 3B:
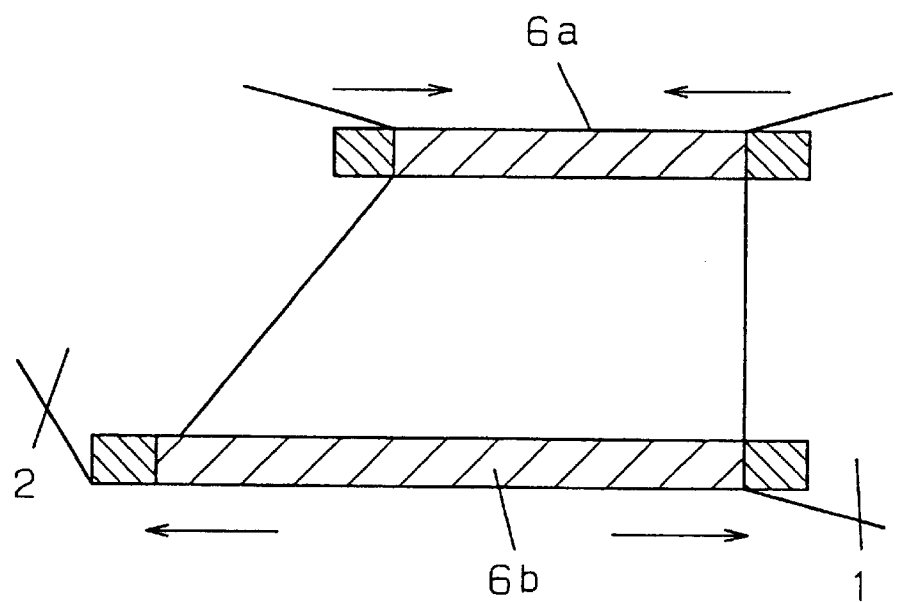
FIG. 3(b) shows the periphery of the fine-motion actuator according to the first embodiment (after the application of electric fields)
Figure 3I:
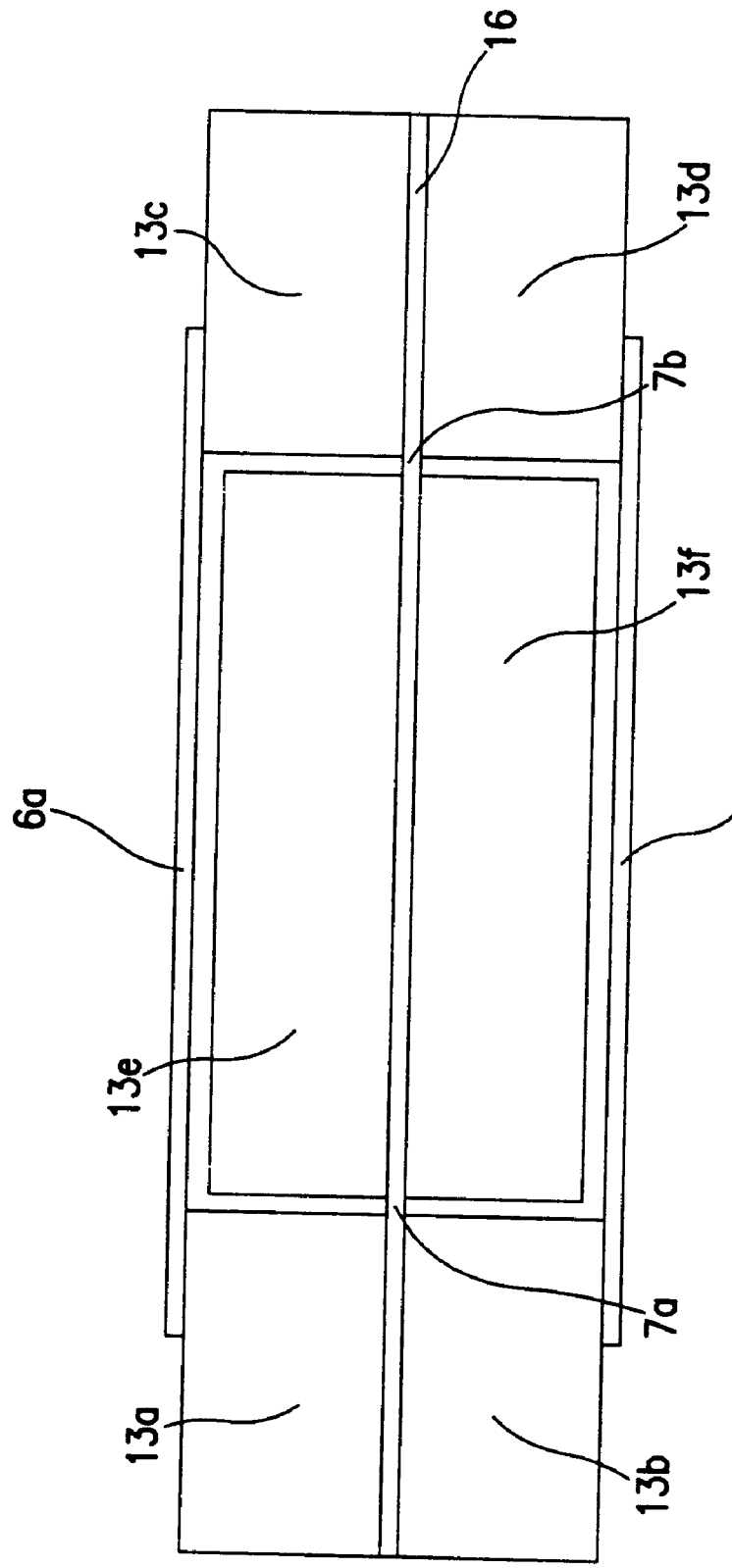

FIG. 3 shows the principle that the suspension 2 is deflected.

FIG. 3a shows the periphery of the fine-motion actuator prior to the application of electric fields, and FIG. 3b shows the periphery of the fine-motion actuator after the application.

By applying electric fields of the same strength in opposite directions, between the front and rear electrodes of each of the piezoelectric elements 6a and 6b, the piezoelectric elements 6a and 6b are simultaneously stretched or contracted by the same amount as shown in FIG. 3b. In addition, since the support arm 1 is fixed to the shaft 5 via the bearing, the suspension 2 is rotationally moved. This rotational motion is expanded according to the length of the suspension 2, thereby enabling the head 3 attached to the tip of the suspension to be moved in the direction shown by the arrow in FIGS. 1 and 2.

With this mechanism, the strength of electric fields applied to the piezoelectric elements 6 can be varied to accurately position at a target position the head 3 that has been coarsely moved by the voice coil motor.

To allow the suspension 2 to rotate more efficiently, it is necessary that the adhered portion between the suspension 2 and the piezoelectric elements 6 can be rotationally moved. Accordingly, the suspension 2 and the piezoelectric elements 6 are desirably adhered together using an adhesive such as a silicon one having a relatively low rigidity.

Figure 4:
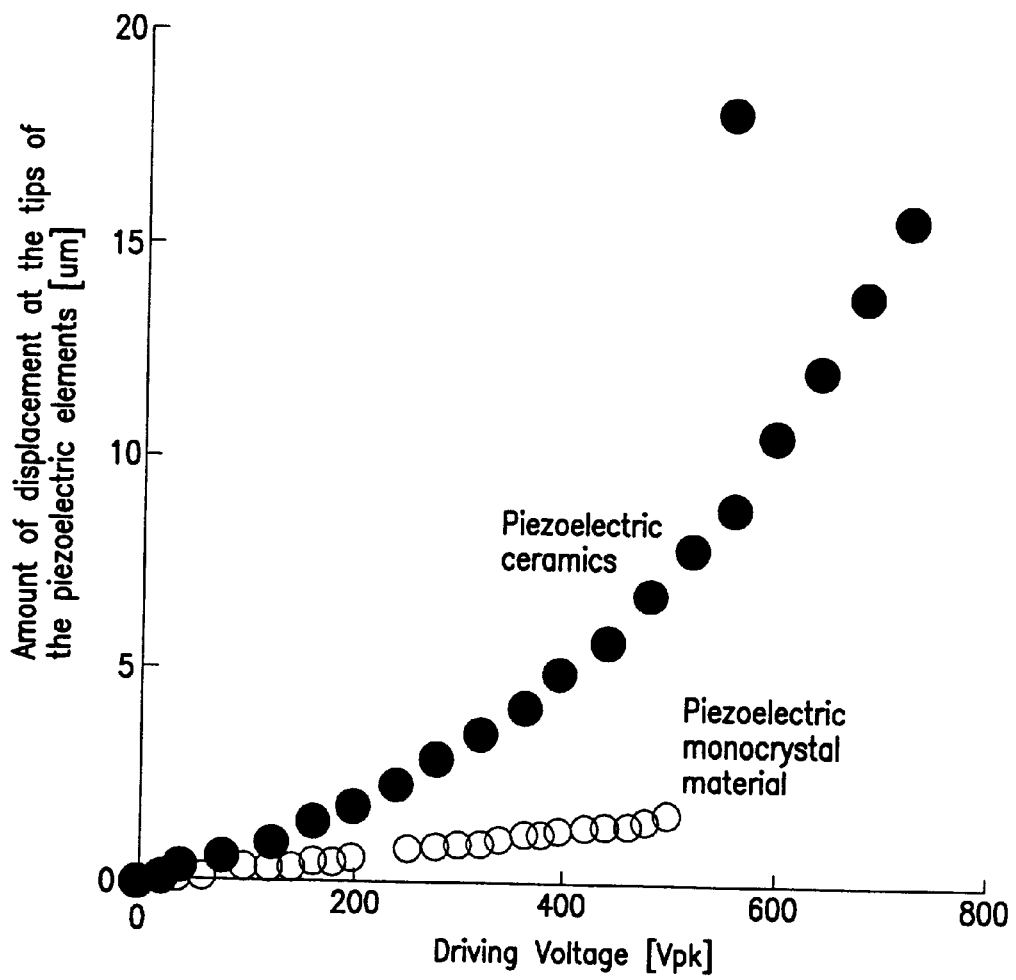
FIG. 4 is a characteristic diagram showing the characteristics of piezoelectric ceramic and a piezoelectric single-crystal material.

Furthermore, the slight non-linearity of the piezoelectric elements must be accounted for in order to improve the moving resolution of the head 3. FIG. 4 shows the results of experiments obtained by plotting the amount of displacement at the tips of the piezoelectric elements of piezoelectric ceramics when sinusoidal signals are applied to the elements with the voltage varied. Even with a small applied voltage, non-linearity is observed in the relationship between the applied voltage and the amount of displacement. However, a similar plot using piezoelectric elements of a piezoelectric singlecrystal material shows linearity from low to high voltages. Thus, by configuring this embodiment using piezoelectric elements of a piezoelectric singlecrystal material, the moving resolution of the head 3 (precision controllability) can be improved easily.

Figure 5:
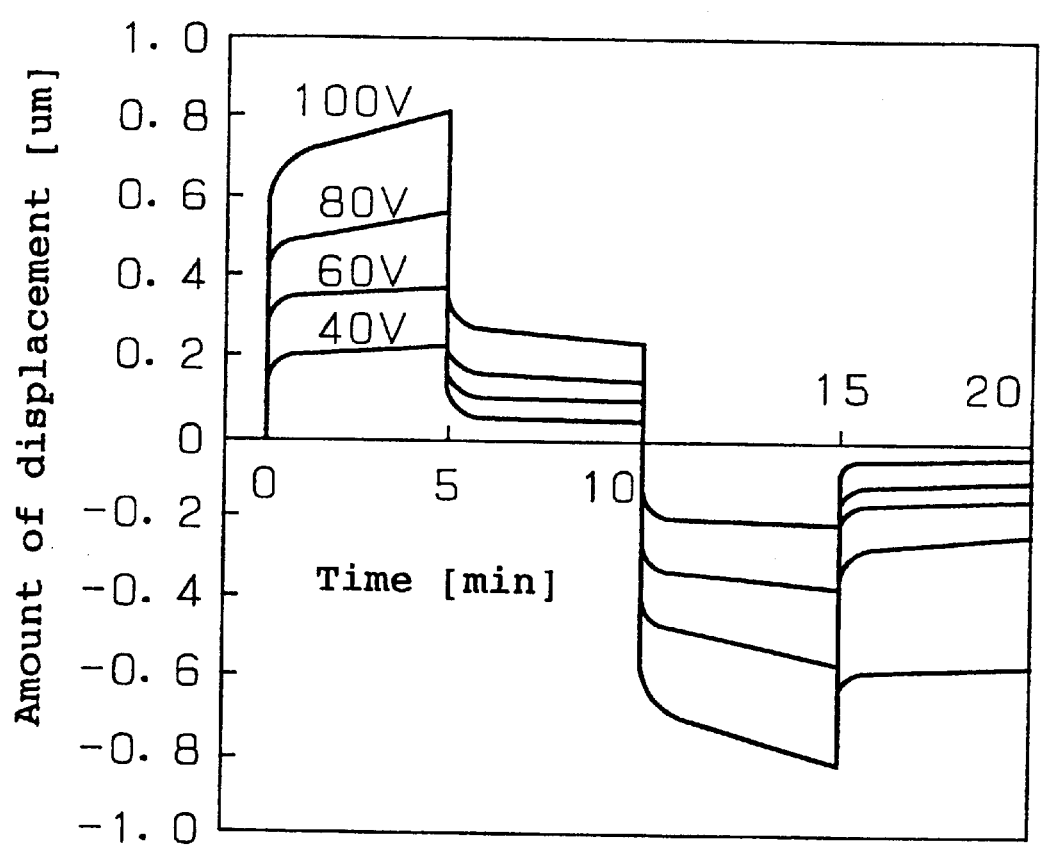
FIG. 5 is a characteristic diagram showing the characteristics of the displacement of piezoelectric ceramic.

Furthermore, displacement creeps (the variation of displacement that occurs when a potential continues to be applied) such as those shown in FIG. 5 are seen in piezoelectric elements of piezoelectric ceramics (No displacement creep phenomenon is observed in the piezoelectric elements of a piezoelectric singlecrystal material). This is the temporal variation of the amount of displacement during DC driving, the amount of displacement increases as the voltage increases as understood from FIG. 5, and is very disadvantageous to very precise position control applications such as this invention. To solve this problem, the applied voltage (applied fields) may be reduced or control may be provided such that the amount of displacement is monitored and maintained constant.

Figure 6:
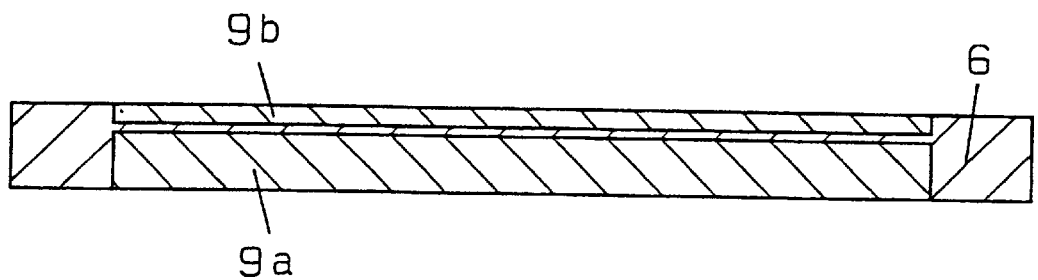
FIG. 6 is a top view showing a configuration of electrodes in the piezoelectric element according to the first embodiment of this invention.
Figure 7:
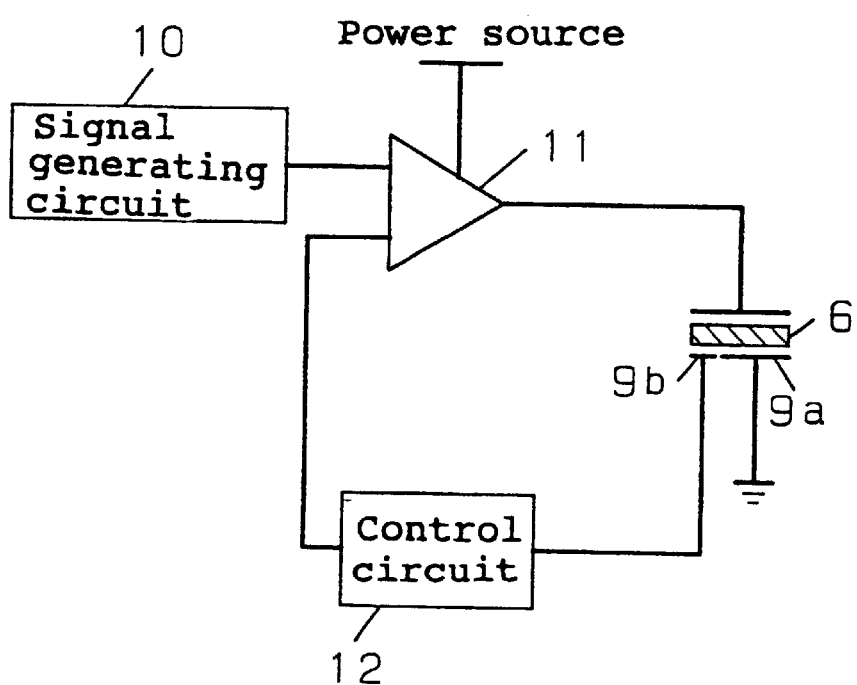
FIG. 7 is a block diagram showing driving executed by the first embodiment of this invention.

In particular, the latter method can be relatively easily implemented by using part of the electrodes in the surfaces of the piezoelectric element as detective electrodes. FIG. 6 shows an example of an electrode structure. In this example, the electrodes 9a and 9b are divided in the longitudinal direction of the elements, but similar effects can be obtained by setting the dividing direction so as to have an arbitrary angle from the longitudinal direction. The piezoelectric elements 6a and 6b, however, desirably have an electrode configuration using the centerline of the first embodiment as a symmetry axis. In principle, electric fields applied to the drive electrode 9a of the element distort the piezoelectric element due to a counter-piezoelectric effect. This configuration converts this distortion into charges using a piezoelectric effect in order to detect a variation in the distortion of the element as a variation in voltage, and if the creep phenomenon increases the distortion of the element, the output voltage from the detective electrode 9b increases. Thus, by effecting feedback control using a feedback circuit such as that shown in the drive block diagram shown in FIG. 7, the creep phenomenon in the element can be eliminated. This does not need to be considered for piezoelectric elements of a piezoelectric singlecrystal material because they do not exhibit the displacement creep phenomenon. Further, 10 stands for a signal generating circuit and 12 stands for a control circuit.

In addition, the piezoelectric singlecrystal material has a better thermal characteristic for a piezoelectric constant than piezoelectric ceramics, so piezoelectric elements composed of the above material have an excellent thermal characteristic for displacement.

Accordingly, the head actuator mechanism using these piezoelectric elements has an excellent thermal characteristic for the amount of displacement, so it can be controlled precisely and easily.

Figure 8:
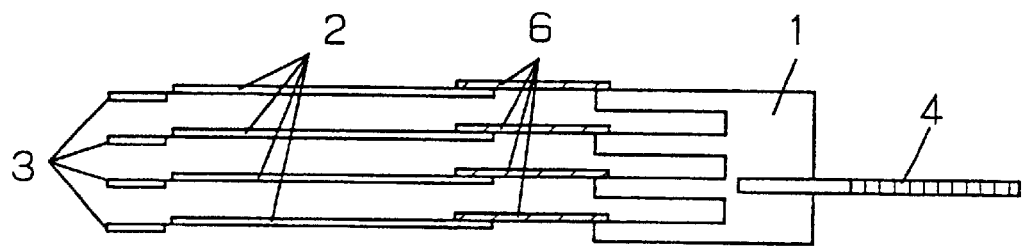
FIG. 8 shows an applied structure of a head actuator mechanism according to the first embodiment.
Figure 9:
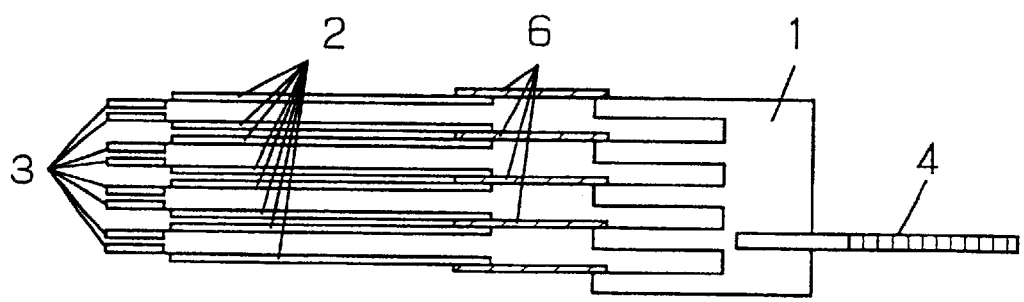
FIG. 9 shows an applied structure of the head actuator mechanism according to the first embodiment.
Figure 10:
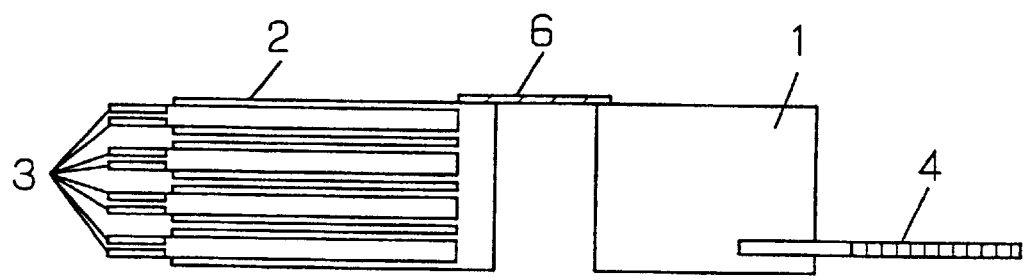
FIG. 10 shows an applied structure of the head actuator mechanism according to the first embodiment.

FIGS. 8 to 10 show a configuration to which the head actuator mechanism shown in FIG. 1 is applied.

The applied structure shown in FIG. 8 is characterized by the simplification of the coarse-motion actuator using only one VCM coil despite the presence of a plurality of heads.

In addition, the head actuator mechanism can also be simplified by driving two suspensions using one set of piezoelectric elements as shown in FIG. 9. Moreover, the head actuator mechanism can further be simplified by integrating a plurality of suspensions together and driving them using one set of piezoelectric elements, as shown in FIG. 10.

Second Embodiment

A second embodiment of this invention is described below with reference to the drawings.

Figure 11:
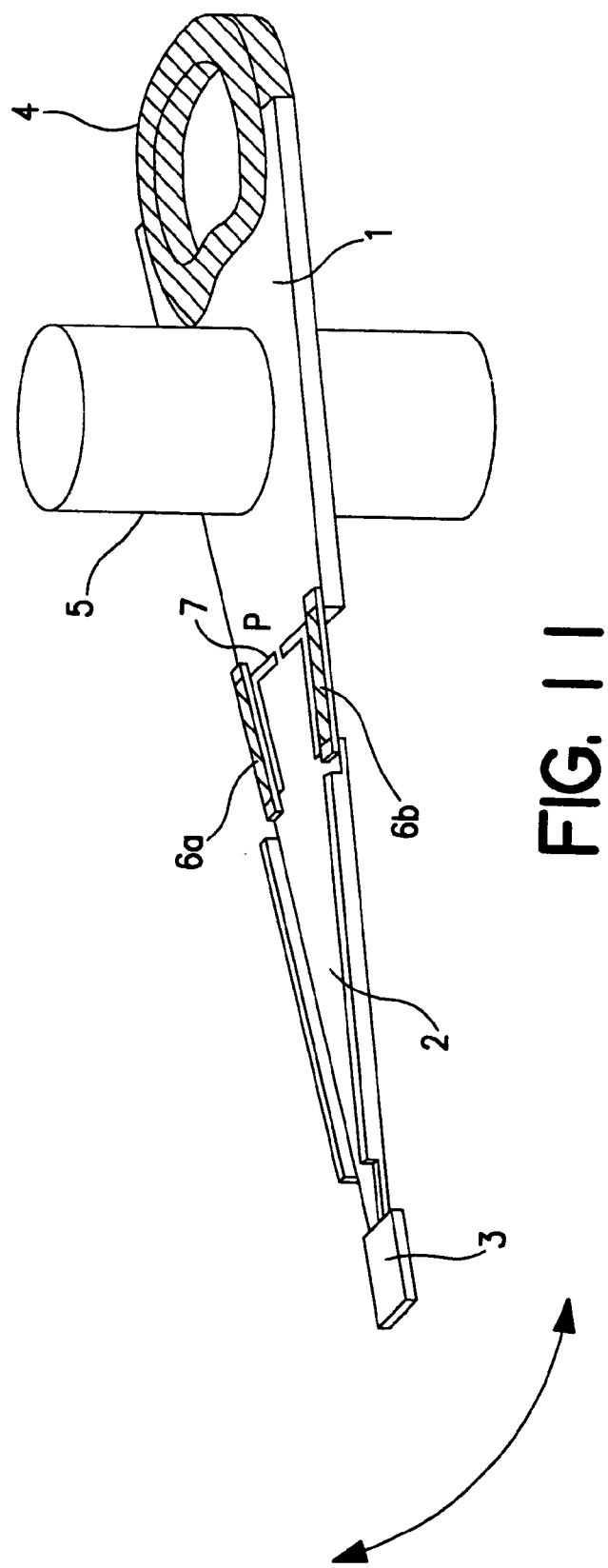
FIG. 11 is a perspective view showing a configuration of a second embodiment of this invention.

FIG. 11 is a perspective view of a head actuator mechanism according to the second embodiment of this invention.

Figure 12:
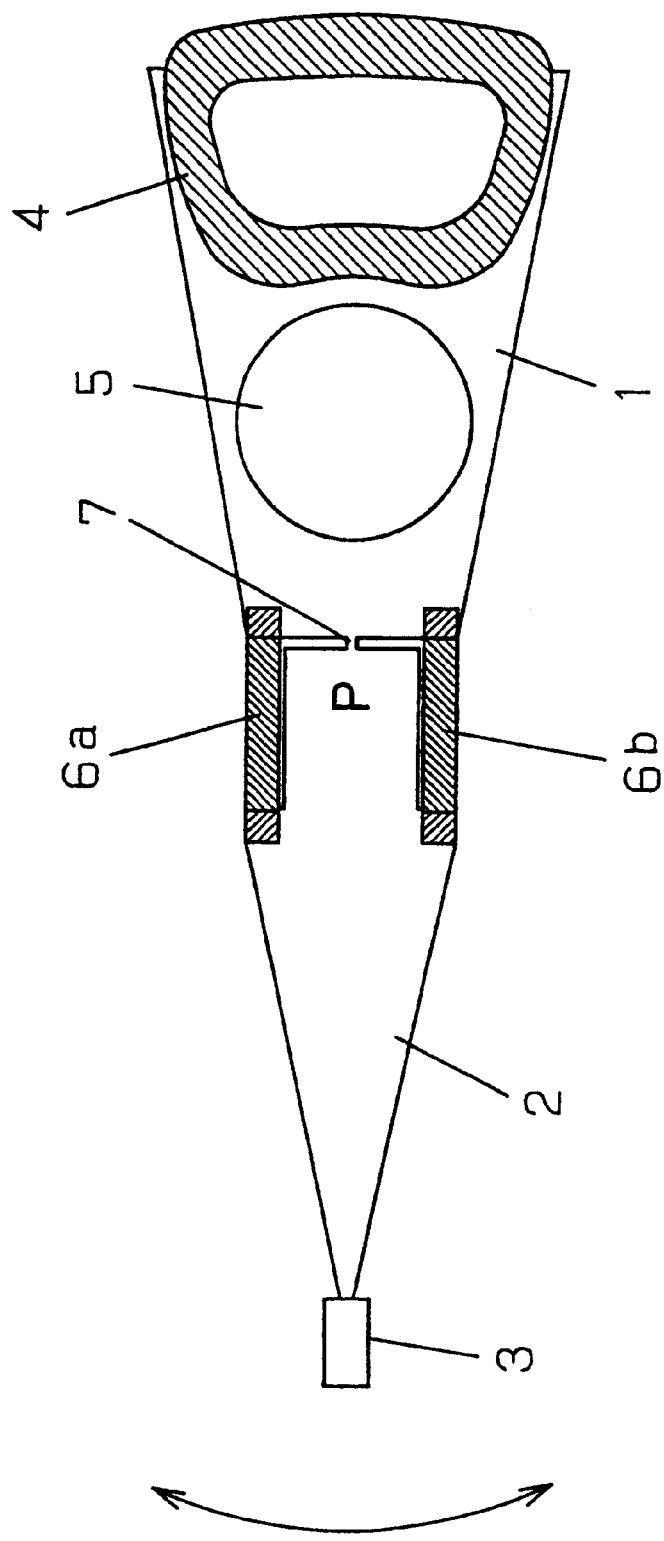
FIG. 12 is a top view showing a configuration of the second embodiment of this invention.

FIG. 12 is a top view of the head actuator mechanism according to the second embodiment of this invention.

In the figures, 1 is a support arm, 2 is a suspension, 3 is head, 4 is a coil for the voice coil motors (VCM), 5 is a shaft and a bearing, and 6a and 6b are piezoelectric elements consisting of piezoelectric bodies, and 7 is a hinge composed of an elastic body.

The piezoelectric elements 6a and 6b each have one end fixed to the suspension arm 1 and the other end fixed to the suspension 2, using an adhesive, respectively.

Electrodes are formed in part of the front and rear surfaces of the piezoelectric elements 6a and 6b, and these elements are polarized in the same thickness direction.

Although this embodiment defines the polarization direction of the piezoelectric elements, the stretching direction of the elements is actually determined by the relationship between the direction of polarization and the direction of applied electric fields. Thus, it is sufficient to apply electric fields in an appropriate direction taking the direction of polarization during the driving into consideration.

By applying electric fields of the same strength in opposite directions, between the front and rear electrodes of each of the piezoelectric elements 6a and 6b, the piezoelectric elements 6a and 6b are simultaneously stretched or contracted by the same amount.

Since the support arm 1 is fixed to the shaft 5 via the bearing, the suspension 2 is rotationally moved. This rotational motion is expanded according to the length of the suspension 2, thereby enabling the head 3 attached to the tip of the suspension to be moved in the direction shown by the arrow in FIGS. 11 and 12.

Furthermore, the hinge mechanism 7 acts as a rotational center for rotational motions of the suspension 2 to enable the stretching and contraction of the piezoelectric elements 6a and 6b to be efficiently converted into the rotational motion of the suspension 2, thereby enabling the head 3 to move over a wider range. The hinge mechanism 7 is formed by extending to the support arm 1 the support arm 1 side of the plate constituting the suspension 2 in FIG. 1 and coupled to the support arm 1 at a narrow portion P. In addition, the hinge mechanism 7 serves to improve the strength of the fine-motion actuator, thereby improving the response frequency.

With this mechanism, the strength of electric fields applied to the piezoelectric elements 6 can be varied to accurately position at a target position the head 3 that has been coarsely moved by the voice coil motor.

To allow the suspension 2 to rotate more efficiently, it is necessary that the adhered portion between the suspension 2 and the piezoelectric elements 6 can be rotationally moved. Accordingly, the suspension 2 and the piezoelectric elements 6 are desirably adhered together using an adhesive such as a silicon one having a relatively low rigidity.

Of course, the moving resolution of the head 3 (precision controllability) can be improved by configuring this embodiment using piezoelectric elements of a piezoelectric single-crystal material.

Figure 13:
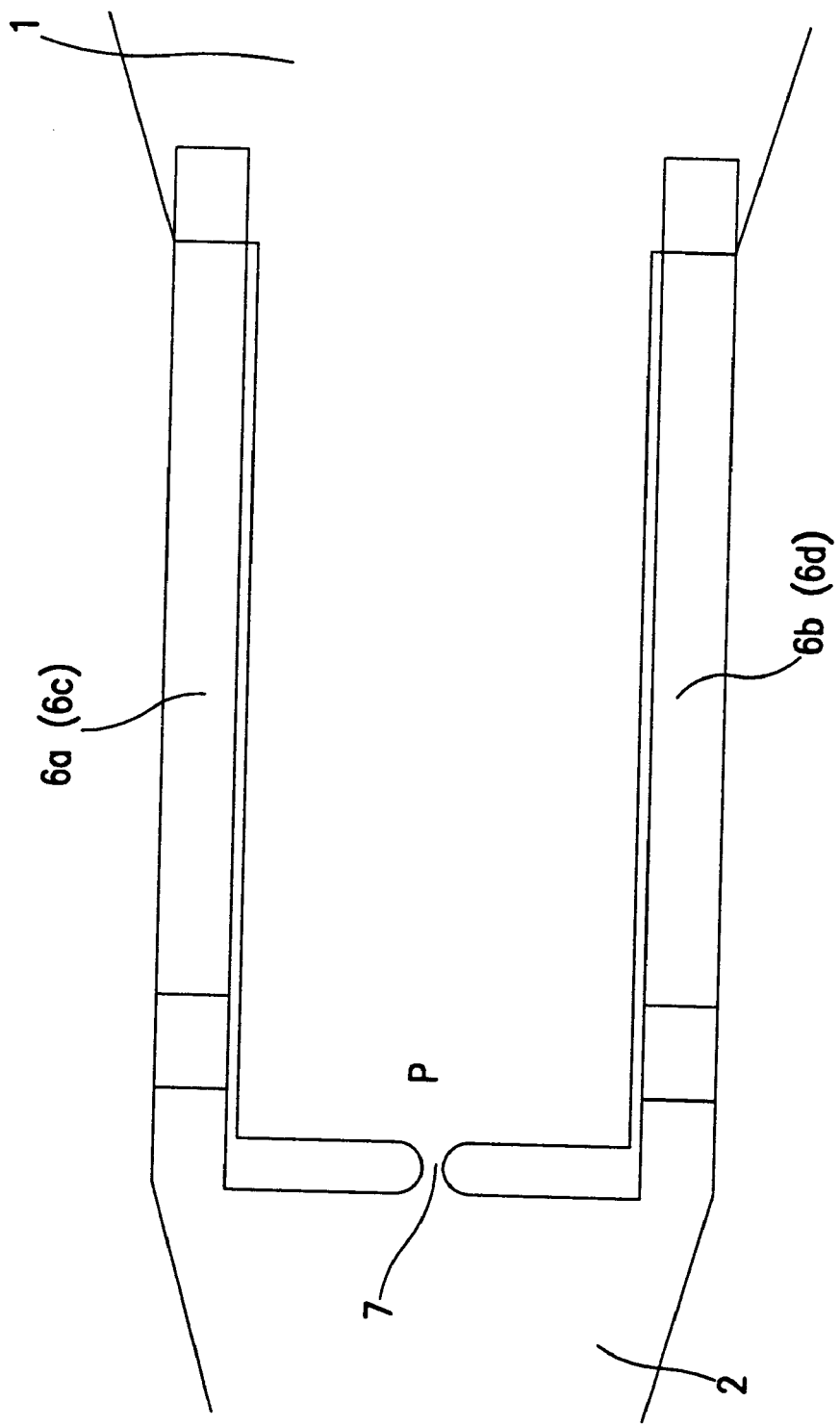
FIG. 13 is a top view showing another configuration of the second embodiment of this invention.

Although this embodiment has been described in conjunction with the hinge 7 formed on the support arm 1 side, similar effects can be obtained by extending the support arm 1 side of the plate to the suspension 2 side and forming the hinge on this side as shown in FIG. 13. In addition, by forming the hinge on both the support arm 1 and suspension 2 sides, the stress occurring in each hinge can be reduced to improve reliability.

Figure 14:
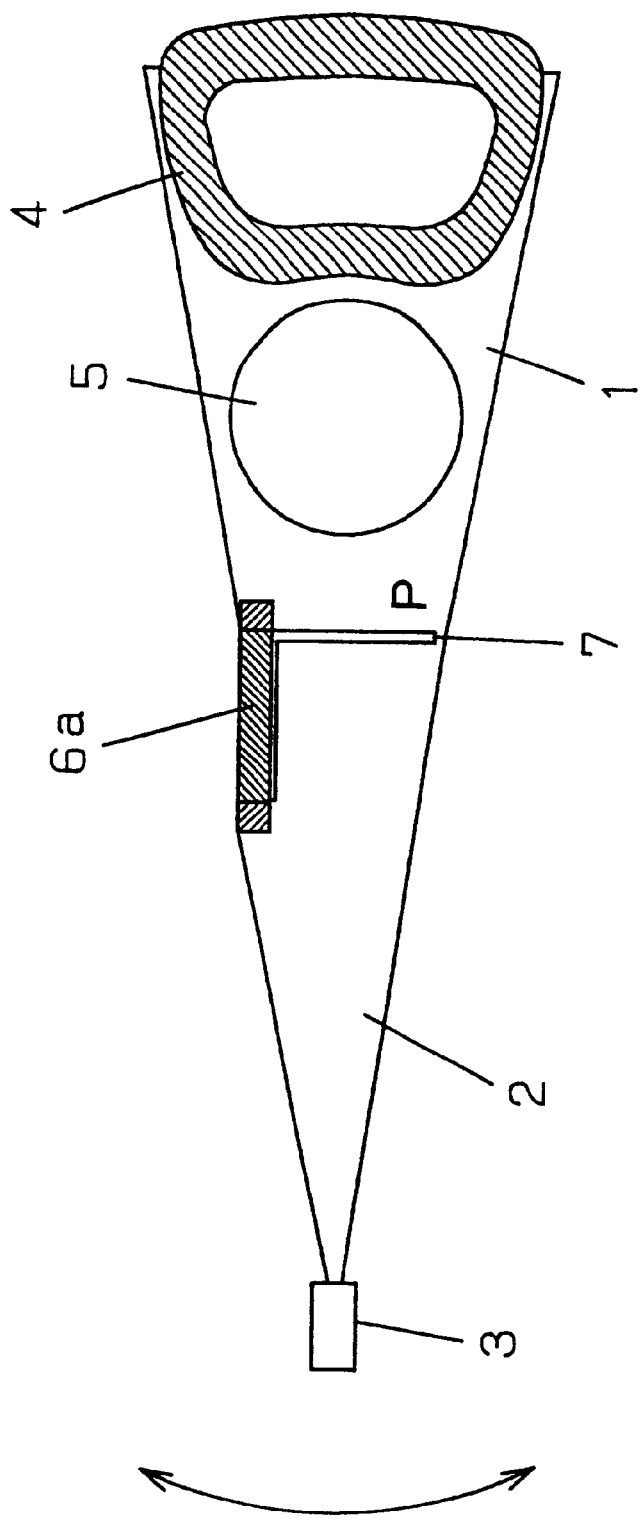
FIG. 14 is a top view showing another configuration of the second embodiment of this invention.

FIG. 14 shows another structure of the second embodiment. This structure is characterized in that only one piezoelectric element is used compared to the two piezoelectric elements in the embodiment shown in FIG. 11. Consequently, this configuration has a simpler structure, and requires only one signal compared to the two types of drive signals of phases offset by 180° required in the configuration shown in FIG. 11.

Of course, by providing detective electrodes in the piezoelectric element as in the first embodiment, effects similar to those of the first embodiment can be obtained.

Third Embodiment

A third embodiment of this invention is described below with reference to the drawings.

Figure 15:
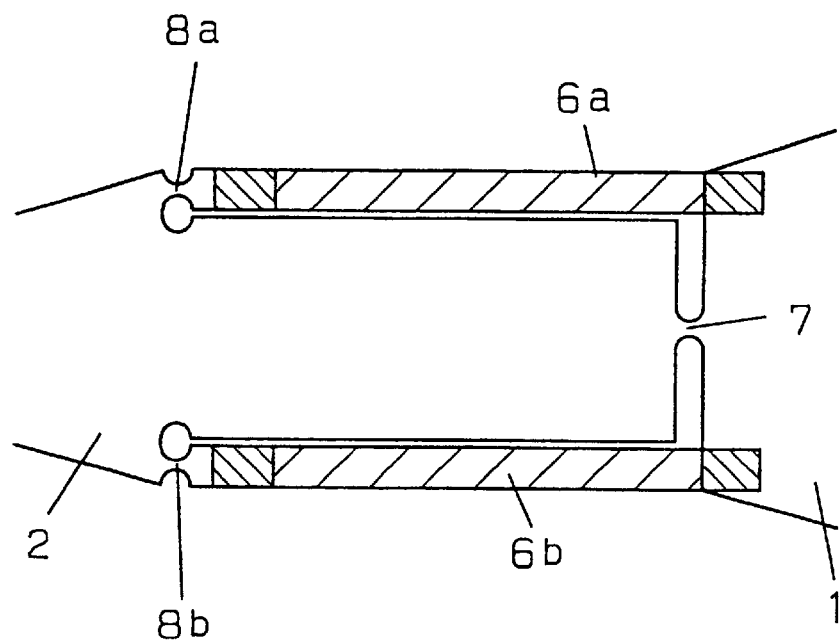
FIG. 15 shows the periphery of a fine-motion actuator according to a third embodiment of this invention.

FIG. 15 is a top view of a fine-motion actuator in a head actuator mechanism according to the third embodiment of this invention.

In the figure, 1 is a support arm, 2 is a suspension, 6a and 6b are piezoelectric elements consisting of piezoelectric bodies, 7 is a hinge composed of an elastic body, and 8a and 8b are hinges used to fix the piezoelectric elements 6a and 6b to the suspension 2.

The coarse-motion actuator and head are similar to those in the first embodiment. The piezoelectric elements 6a and 6b each have one end fixed to the support arm 1 and the other end fixed to the suspension 2 via the element-fixing hinges 8a and 8b, using an adhesive, respectively.

Since the support arm 1 is fixed to the shaft 5 via the bearing, the suspension 2 is rotationally moved. This rotational motion is expanded according to the length of the suspension 2, thereby enabling the head 3 attached to the tip of the suspension to be moved.

Furthermore, the hinge mechanism 7 acts as a rotational center for rotational motions of the suspension 2 to enable the stretching and contraction of the piezoelectric elements 6a and 6b to be efficiently converted into the rotational motion of the suspension 2, thereby enabling the head 3 to move over a wider range.

In addition, the hinge mechanism 7 serves to improve the strength of the fine-motion actuator, thereby improving the response frequency.

In addition, to allow the suspension 2 to rotationally move, an angular moment acts on the adhered portion between the piezoelectric elements 6a and 6b and the suspension 2. Embodiments 1 and 2 use an adhesive such as a silicon one having a relatively low elastic strength to adhere the piezoelectric elements 6a and 6b and the suspension 2 together in order to reduce the angular moment occurring in the adhered portion. An adhesive of a low elastic strength may cause large losses in converting the stretching and contraction of the elements 6a and 6b into the rotation of the suspension 2.

Thus, this embodiment provides the element-fixing hinges 8a and 8b of a structure that reduces the angular moment occurring in the adhered portion to minimize the losses in converting the stretching and contraction of the elements 6a and 6b into the rotation of the suspension 2. The hinges 8a and 8b enable the suspension 2 to rotate through a larger angle to enable the head section to move over a wider range. In addition, since the spring coefficient of the hinge mechanism relative to bending deformation is constant compared to the adhesive, the relationship between the amount of distortion of the piezoelectric element and the amount of movement of the head section exhibits linearity. As a result, the relationship between electric fields applied to the piezoelectric elements 6a and 6b and the amount of movement of the head section exhibits an almost linear characteristic despite a slight non-linearity between the distortion of the piezoelectric elements and applied electric fields, thereby improving precision controllability.

Of course, the moving resolution of the head 3 (precision controllability) can be improved by configuring this embodiment using piezoelectric elements of a piezoelectric single-crystal material as in the first and second embodiments.

Although this embodiment has been described in conjunction with the hinge 7 formed on the support arm 1 side, similar effects can be obtained by forming the hinge on the suspension 2 side as in FIG. 13 showing the second embodiment. In addition, by forming the hinge on both the support arm 1 and suspension 2 sides, the stress occurring in each hinge can be reduced to improve reliability.

Moreover, although the element-fixing hinges 8a and 8b are formed only on the coupled portion between the piezoelectric elements 6a and 6b and the suspension 2, similar effects can be obtained by forming the hinges on the coupled portion between the piezoelectric elements 6a and 6b and the support arm 1.

In addition, by forming the element-fixing hinge on both the coupled portions between the piezoelectric elements 6a and 6b and the suspension 2 and between the piezoelectric elements 6a and 6b and the support arm 1, the stress occurring in each hinge can be reduced to improve reliability.

Figure 16:
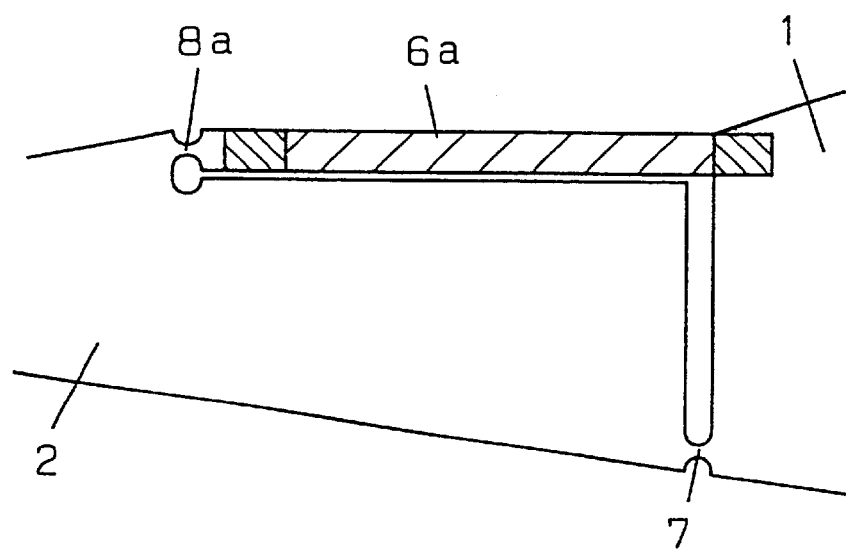
FIG. 16 shows the periphery of a fine-motion actuator of another configuration according to the third embodiment of this invention.

FIG. 16 shows another structure of the third embodiment. This structure is characterized in that only one piezoelectric element is used compared to the two piezoelectric elements in the preceding invention. Consequently, this configuration has a simpler structure, and requires only one signal compared to the two types of drive signals with phases offset by 180° required in the preceding invention.

Of course, by providing detective electrodes in the piezoelectric element as in the first embodiment, effects similar to those of the first embodiment can be obtained.

Fourth Embodiment

A fourth embodiment of this invention is described below with reference to the drawings.

Figure 17:
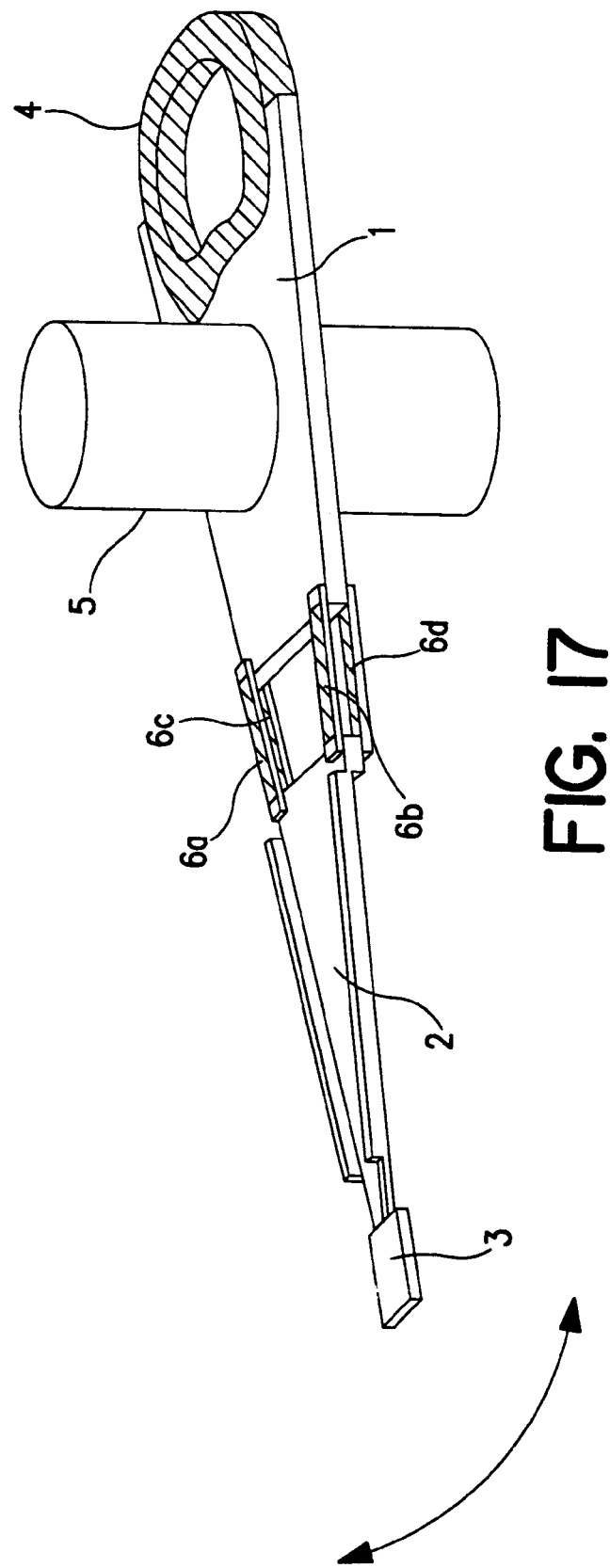
FIG. 17 is a perspective view showing a configuration of a fourth embodiment of this invention.

FIG. 17 is a perspective view of a head actuator mechanism according to the fourth embodiment of this invention.

In the figure, 1 is a support arm, 2 is a suspension, 3 is head, 4 is a coil for the voice coil motors (VCM), 5 is a shaft and a bearing, and 6a, 6b, 6c, and 6d are piezoelectric elements consisting of piezoelectric bodies each having one end fixed to the support arm 1 and the other end are connected to the suspension 2 using an adhesive, respectively.

Electrodes are formed in part of the front and rear surfaces of each of the piezoelectric elements 6a, 6b, 6c, and 6d, and the elements are polarized in the thickness direction.

Furthermore, the polarizing direction and the direction of electric fields applied between the electrodes in the front and rear surfaces are determined so that the displacement of the piezoelectric elements 6a and 6c is opposite to the displacement of the piezoelectric elements 6b and 6d.

Consequently, if the stretching of the piezoelectric elements 6a and 6c is excited, the same amount of contraction of the piezoelectric elements 6b and 6d is excited. The other part of this embodiment is similar to that of the embodiment in FIG. 1.

In addition, the use of four piezoelectric elements improves the strength of the fine-motion actuator section to enable the control frequency to be set at a high value.

Besides, by arbitrarily setting the strength of electric fields applied to the piezoelectric elements 6a, 6b, 6c, and 6d, the head 3 can be moved three-dimensionally.

Of course, this embodiment can provide effects equivalent to those of the first embodiment.

Figure 18:
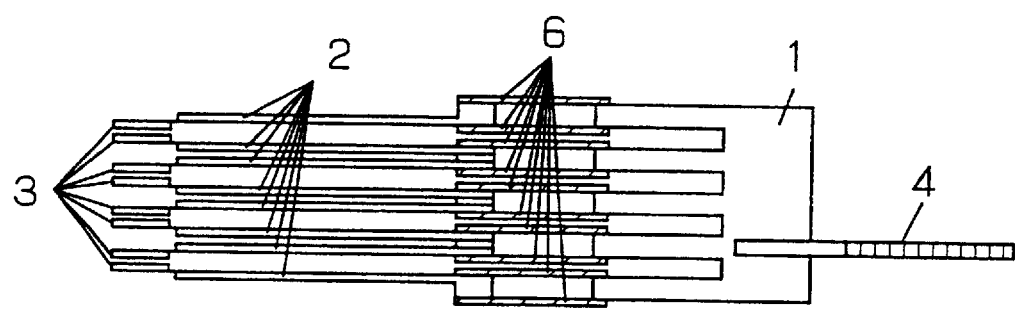
FIG. 18 shows an applied structure of a head actuator mechanism according to the fourth embodiment.
Figure 19:
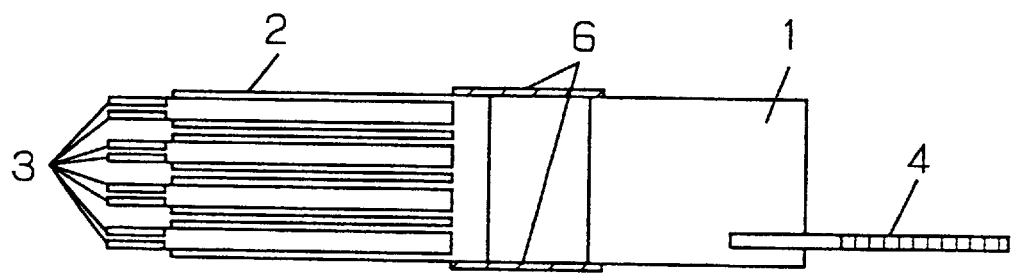
FIG. 19 shows an applied structure of the head actuator mechanism according to the fourth embodiment.

FIGS. 18 and 19 show an applied configuration of the head actuator mechanism shown in FIG. 17.

In the applied structure in FIG. 18, the coarse-motion actuator can be simplified using only one VCM coil despite the presence of a plurality of heads.

In addition, the head actuator mechanism can further be simplified by integrating a plurality of suspensions together and driving them using one set of piezoelectric elements, as shown in FIG. 19.

Fifth Embodiment

A fifth embodiment of this invention is described below with reference to the drawings.

Figure 20:
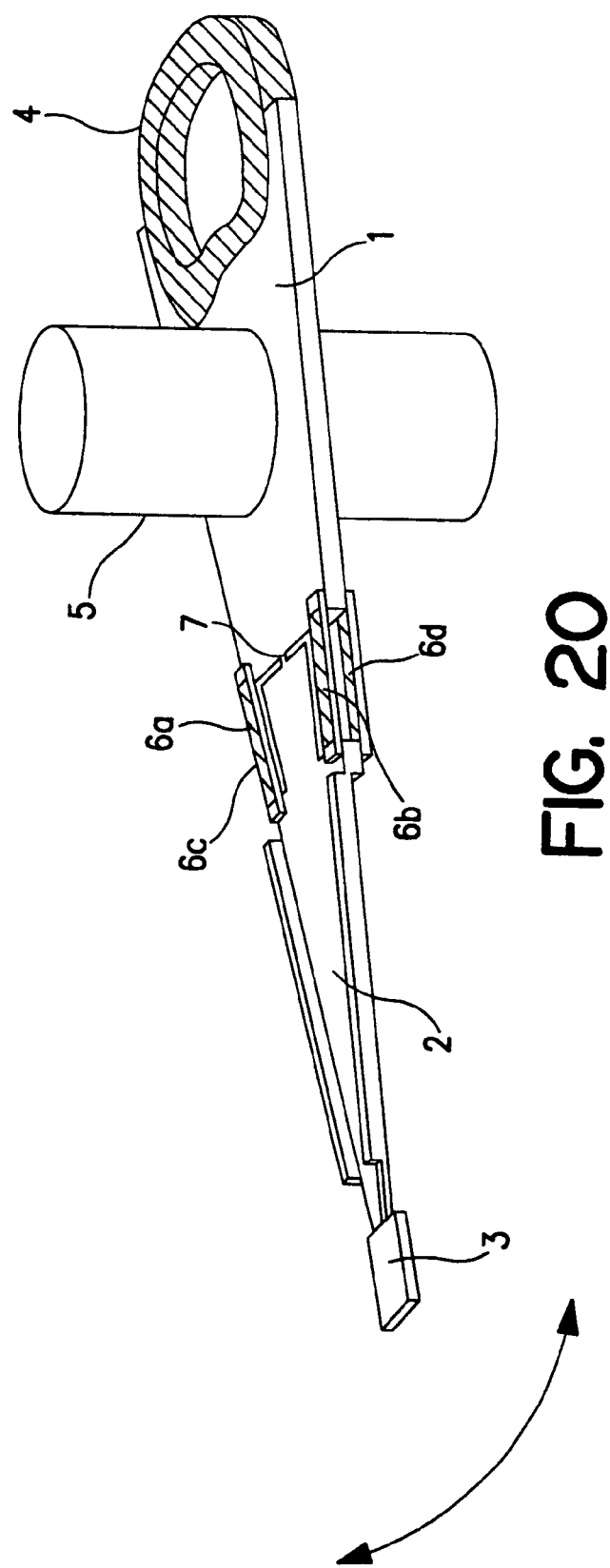
FIG. 20 is a perspective view showing a configuration of a fifth embodiment of this invention.

FIG. 20 is a perspective view of a head actuator mechanism according to the fifth embodiment of this invention.

Figure 21:
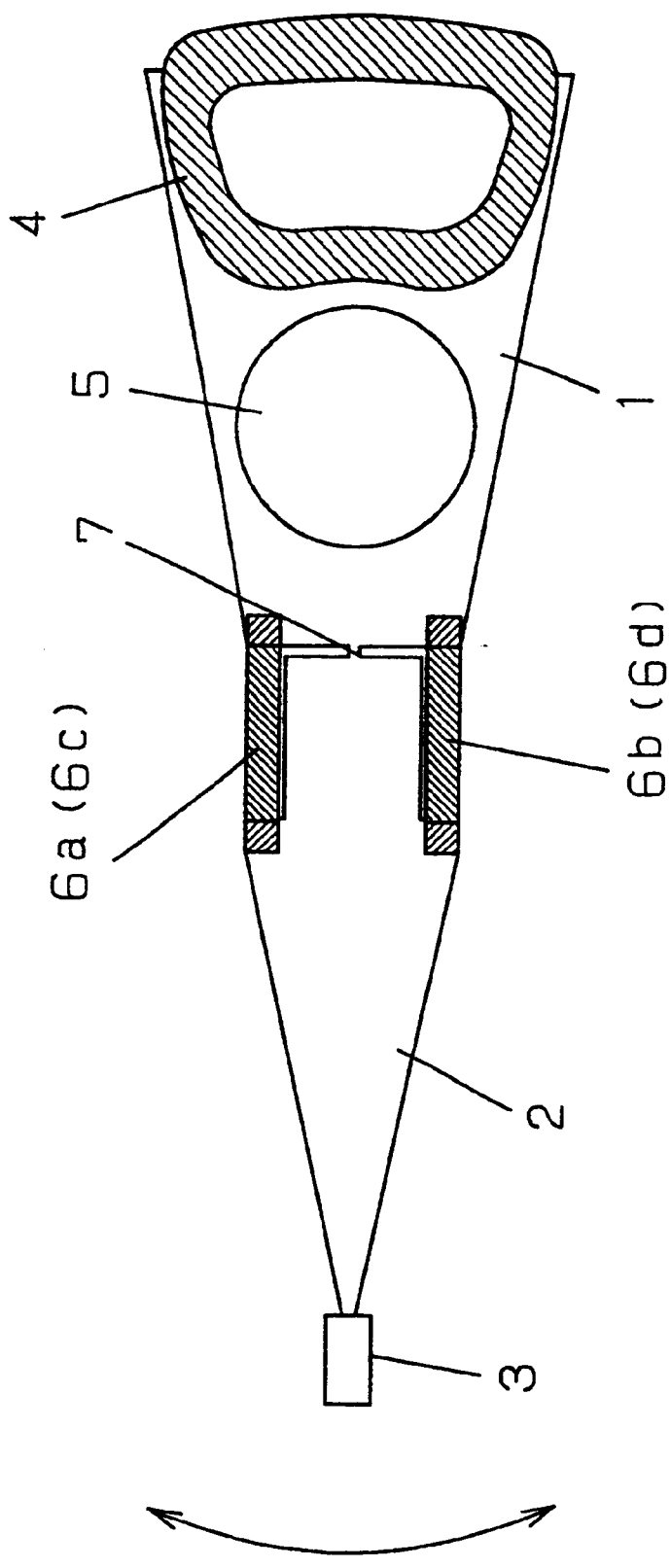
FIG. 21 is a top view showing a configuration of the fifth embodiment of this invention.

FIG. 21 is a top view of the head actuator mechanism according to the fifth embodiment of this invention.

In the figures, 1 is a support arm, 2 is a suspension, 3 is head, 4 is a coil for the voice coil motors (VCM), 5 is a shaft and a bearing, and 6a, 6b, 6c, and 6d are piezoelectric elements consisting of piezoelectric bodies, and 7 is a hinge composed of an elastic body.

The piezoelectric elements 6a, 6b, 6c, and 6d each have one end fixed to the support arm 1 and the other end fixed to the suspension 2, using an adhesive, respectively. The other configuration is similar to that of the embodiment in FIG. 1.

Since the support arm is fixed to the shaft 5 via the bearing, the stretching motion of the piezoelectric elements 6a, 6c and 6b, 6d causes the suspension 2 to be rotationally moved. This rotational motion is expanded according to the length of the suspension 2, thereby enabling the head 3 attached to the tip of the suspension to be moved in the direction shown by the arrow in FIGS. 20 and 21.

Furthermore, the hinge mechanism 7 acts as a rotational center for rotational motions of the suspension 2 to enable the stretching and contraction of the piezoelectric elements 6a, 6b, 6c, and 6d to be efficiently converted into the rotational motion of the suspension 2, thereby enabling the head 3 to move over a wider range. In addition, the hinge mechanism 7 serves to improve the strength of the fine-motion actuator, thereby enabling the control frequency to be set at a high value.

With this mechanism, electric fields applied to the piezoelectric elements 6 can be varied to accurately position at a target position the head 3 that has been coarsely moved by the voice coil motor.

To allow the suspension 2 to rotate more efficiently, it is necessary that the adhered portion between the suspension 2 and the piezoelectric elements 6 can be rotationally moved. Accordingly, the suspension 2 and the piezoelectric elements 6 are desirably adhered together using an adhesive such as a silicon one having a relatively low rigidity.

Besides, even if electric fields applied to the piezoelectric elements 6a, 6b, 6c, and 6d vary individually, information destruction caused by the contact between the head 3 and a recording medium can be prevented because the hinge 7 defines the moving direction of the head 3. Consequently, a reliable magnetic disc apparatus can be realized.

In addition, the use of four piezoelectric elements improves the strength of the fine-motion actuator section to enable the control frequency to be set at a high value.

Of course, this embodiment can provide effects equivalent to those of the second embodiment.

Sixth Embodiment

A sixth embodiment of this invention is described below with reference to the drawings.

A head actuator according to this invention is composed of a coarse-motion actuator and a fine-motion actuator each consisting of a VCM.

Figure 22:
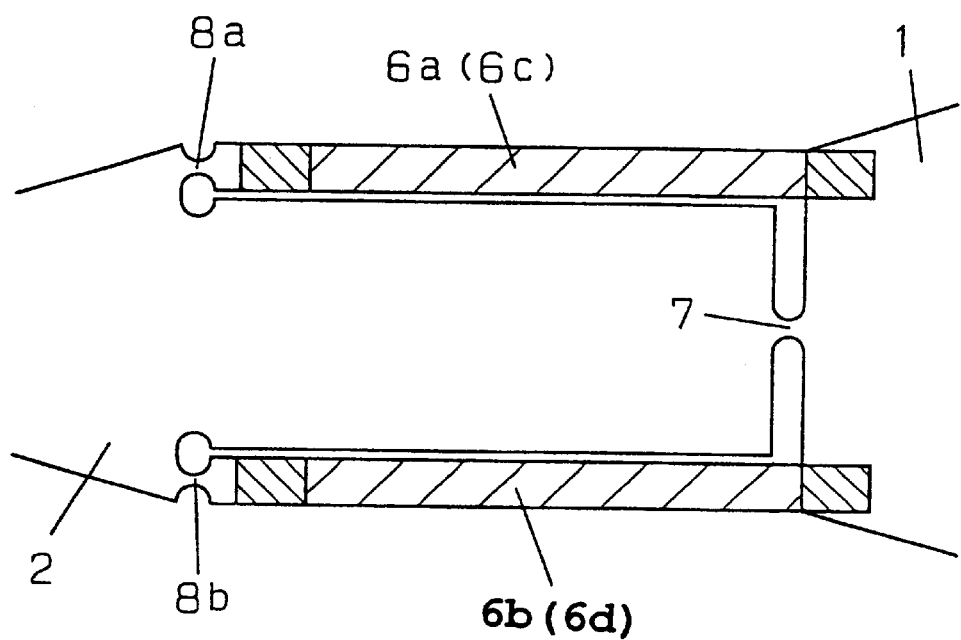
FIG. 22 shows the periphery of a fine-motion actuator according to a sixth embodiment of this invention.

FIG. 22 is a top view of a fine-motion actuator in a head actuator mechanism according to the sixth embodiment of this invention.

In the figure, 1 is a support arm, 2 is a suspension, 6a, 6b, 6c, and 6d are piezoelectric elements consisting of piezoelectric bodies, 7 is a hinge composed of an elastic body, and 8a and 8b are hinges used to fix the piezoelectric elements to the suspension 2.

The piezoelectric elements 6a, 6b, 6c, and 6d each have one end fixed to the support arm 1 and the other end fixed to the suspension 2 via the element-fixing hinges 8a and 8b, using an adhesive, respectively.

The other configuration is similar to that in FIG. 21.

The above configuration can provide a reliable magnetic disc apparatus and thus a head actuator mechanism having excellent precision controllability.

Although this embodiment has been described in conjunction with the hinge 7 formed on the support arm 1 side, similar effects can be obtained by forming the hinge on the suspension 2 side as in FIG. 13 showing the second embodiment. In addition, by forming the hinge on both the support arm 1 and suspension 2 sides, the stress occurring in each hinge can be reduced to improve reliability.

Moreover, although the element-fixing hinges 8a and 8b are formed only on the coupled portion between the piezoelectric elements 6a, 6b, 6c, and 6d and the suspension 2, similar effects can be obtained by forming the hinges on the coupled portion between the piezoelectric elements 6a, 6b, 6c, and 6d and the support arm 1.

Figure 23:
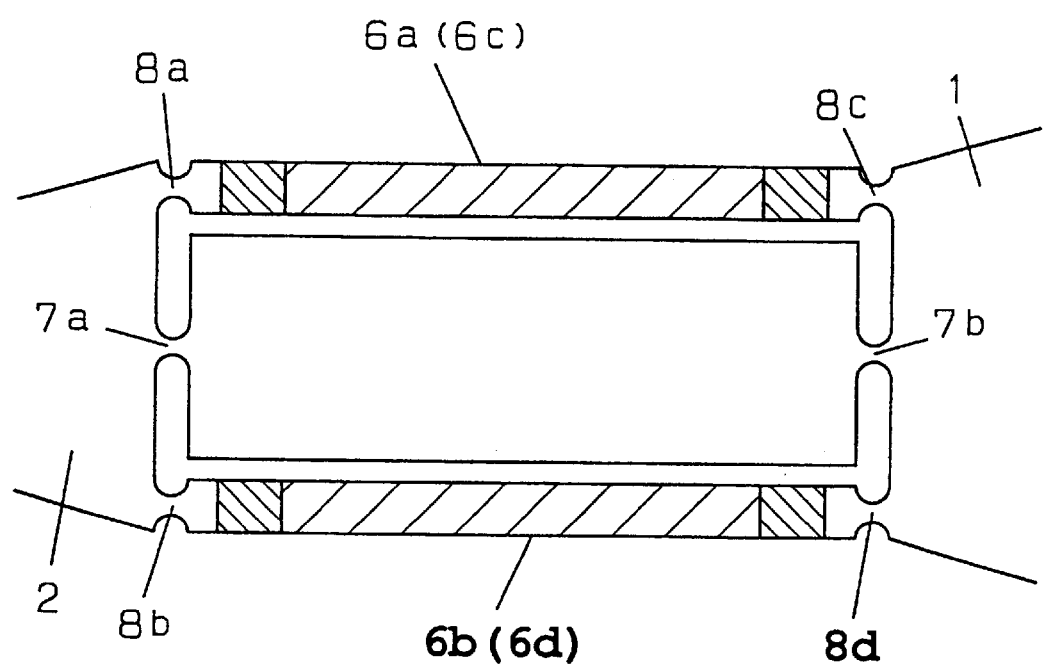
FIG. 23 is a top view showing another configuration of the sixth embodiment of this invention.

In addition, by forming the element-fixing hinges 8a and 8b on both the coupled portions between the piezoelectric elements 6a, 6b, 6c, and 6d and the suspension 2 and between the piezoelectric elements 6a, 6b, 6c, and 6d and the support arm 1, the stress occurring in each hinge can be reduced to improve reliability (FIG. 23).

Of course, this embodiment can provide effects similar to those of the third embodiment.

Seventh Embodiment

A seventh embodiment of this invention is described below with reference to the drawings.

Figure 24:
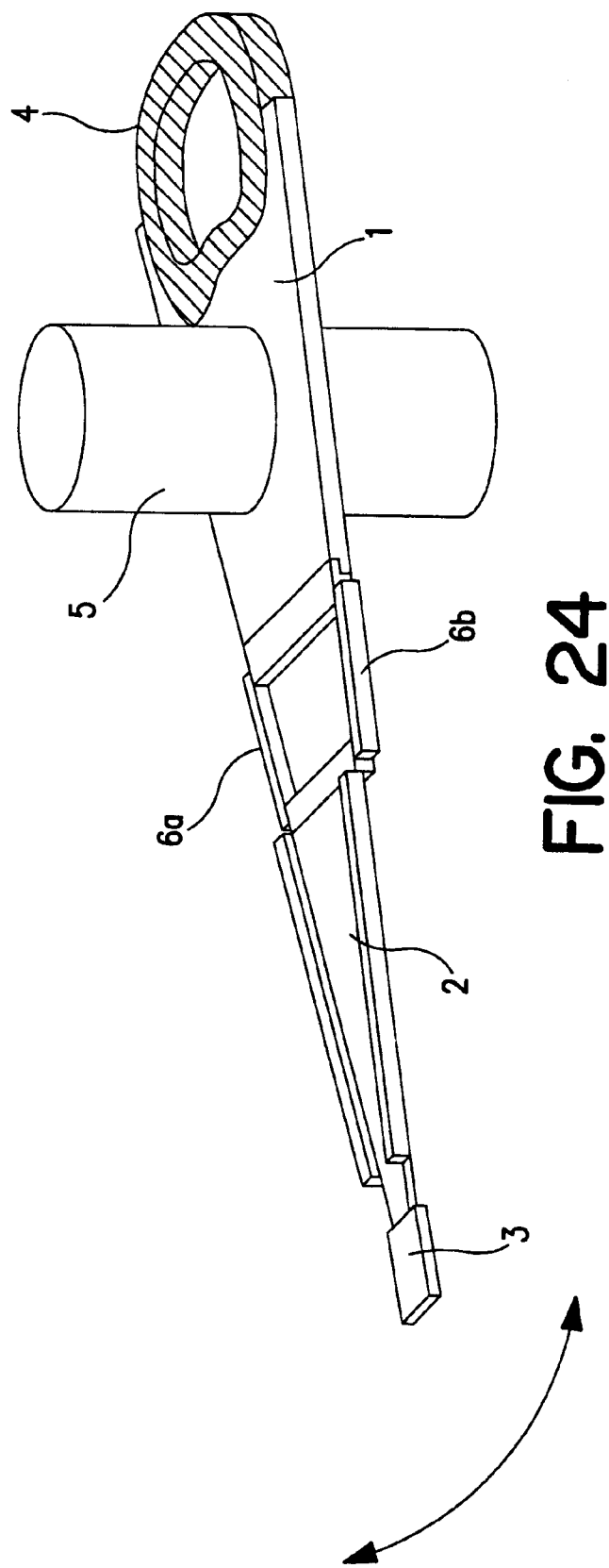
FIG. 24 is a perspective view showing a configuration of the seventh embodiment of this invention.

FIG. 24 is a perspective view of a head actuator mechanism according to the seventh embodiment of this invention.

In the figure, 1 is a support arm, 2 is a suspension, 3 is a head, 4 is a coil for voice coil motors (VCM), 5 is a shaft and a bearing, and 6a and 6b are piezoelectric elements consisting of piezoelectric bodies each having one end fixed to the support arm 1 and the other end fixed to the suspension 2, using an adhesive, respectively. Electrodes are formed in part of the front and rear surfaces of each of the piezoelectric elements 6a and 6b, and the elements are polarized in the same thickness direction. The stretching vibration of the piezoelectric elements 6a and 6b is excited in the longitudinal direction when electric fields are applied to the electrodes in the front and rear surfaces.

Since the support arm 1 is fixed to the shaft 5 via the bearing, the suspension 2 is rotationally moved. This rotational motion is expanded according to the length of the suspension 2, thereby enabling the head 3 attached to the tip of the suspension to be moved.

This embodiment differs from the first embodiment in the mounting positions of the piezoelectric elements.

According to the configuration in FIG. 1, the rigidity of the head actuator in the direction of its height is determined by the thickness of the piezoelectric element and the Young's modulus, so the impact resistance of the actuator mechanism in the direction of its thickness significantly decreases as the thickness of the piezoelectric element decreases to decrease a driving voltage. According to this embodiment, however, since the impact resistance in the direction of the height is determined by the width of the piezoelectric element and the Young's modulus, the thickness of the piezoelectric element can be reduced while the impact resistance is maintained, thereby enabling driving with a low driving voltage.

Moreover, the other structure is the same as in the first embodiment, so this configuration can provide effects similar to those of the configuration in FIG. 1.

Figure 25:
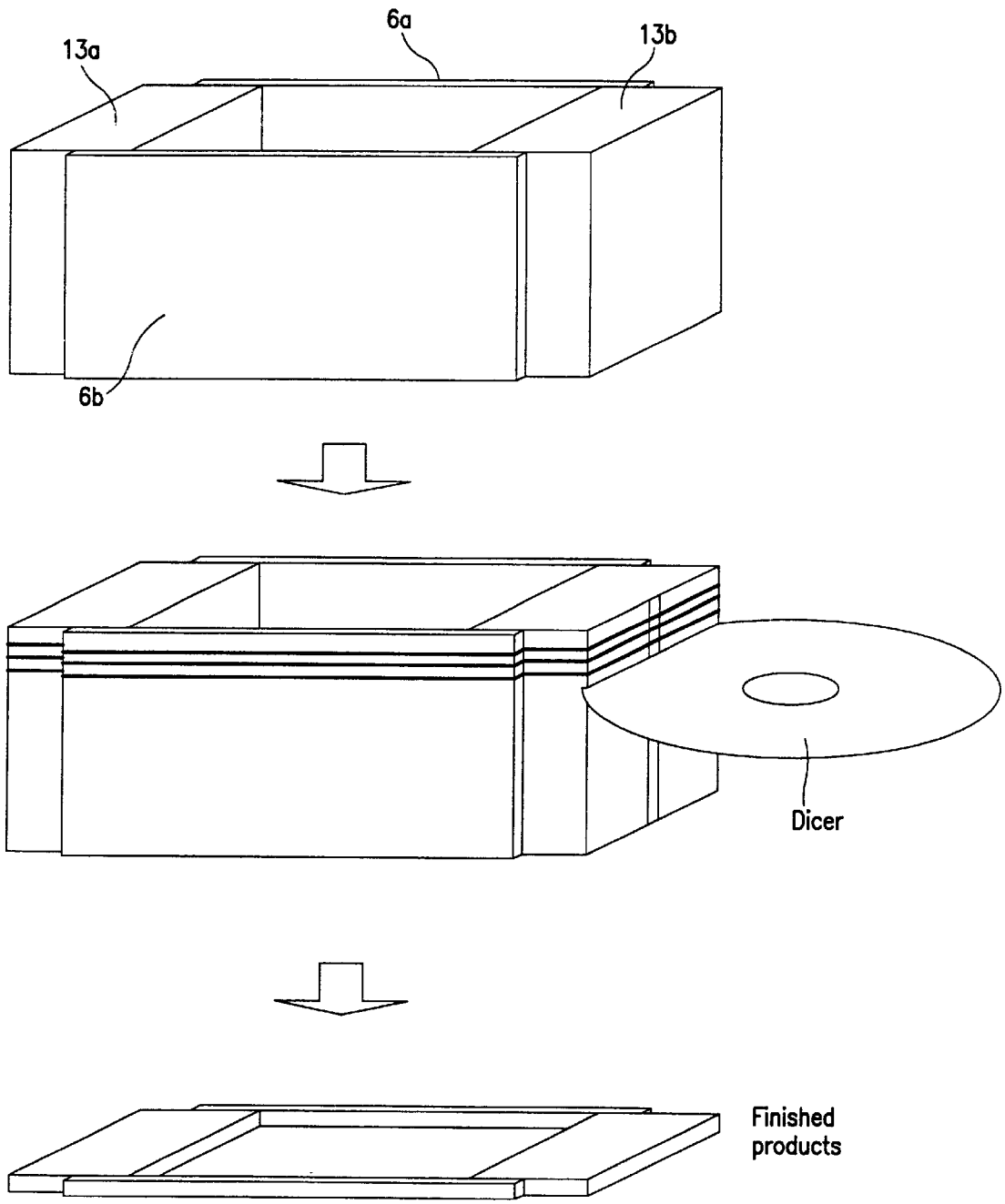
FIG. 25 shows a method for manufacturing the seventh embodiment.
Figure 26:
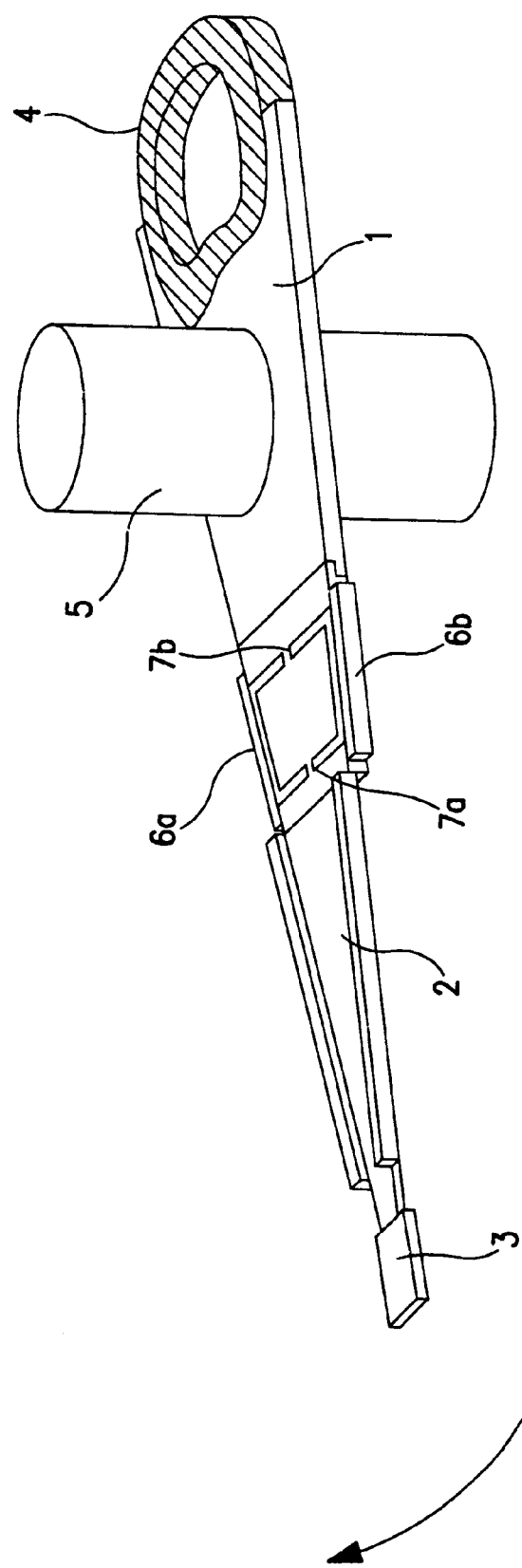
FIG. 26 is a perspective view showing another configuration of the seventh embodiment of this invention.

FIG. 25 shows a method for manufacturing the configuration of this invention shown in FIG. 24. According to this manufacturing method, a block 13a (a suspension material corresponding to a suspension mounted portion) and a block 13b (a support arm material corresponding to a support arm mounted portion) constituting an actuator mechanism section that is large in the direction of its thickness are first manufactured using an appropriate working method such as cutting work. Next, piezoelectric element materials 6a and 6b that are sufficiently large in the direction of their width are joined with the blocks 13a and 13b at predetermined positions. Finally, these blocks are sliced into pieces of an appropriate thickness using a dicer or a wire saw. A head actuator is then completed by merging the suspension mounted portion with the suspension body section and merging the support arm mounted portion with the support arm body section. This manufacturing method enables a large number of actuators to be manufactured relatively inexpensively.

Of course, the effects described in Embodiments 2 and 3 are added by providing the hinges 7a and 7b in the middle of the actuator mechanism or providing the hinges 8a, 8b, 8c, and 8d on the mounted portions of the piezoelectric elements as in Embodiments 2 and 3 as shown in FIGS. 26 to 30.

Figure 28:
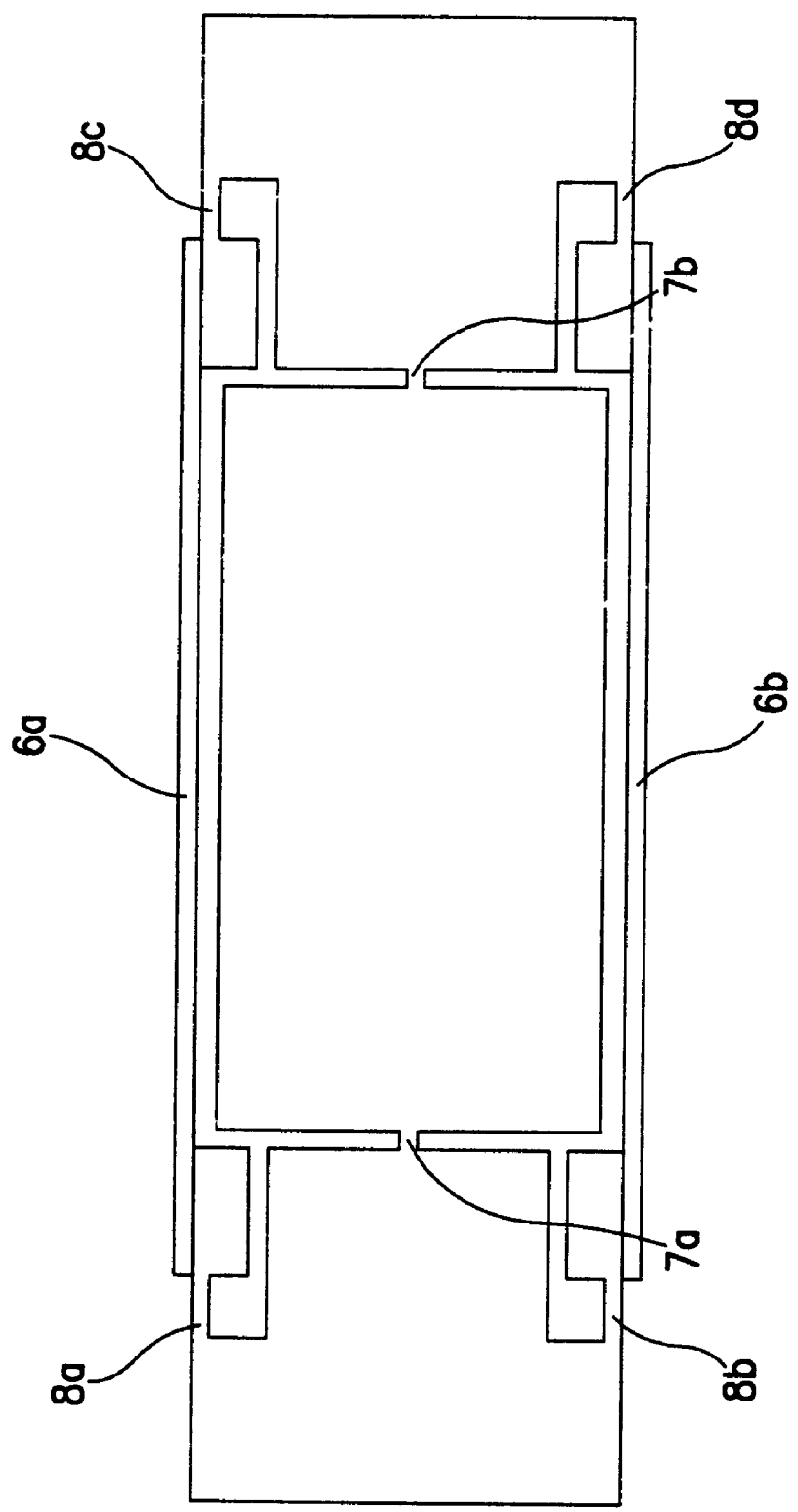
FIG. 28 is a top view showing another configuration of the seventh embodiment of this invention.
Figure 29:
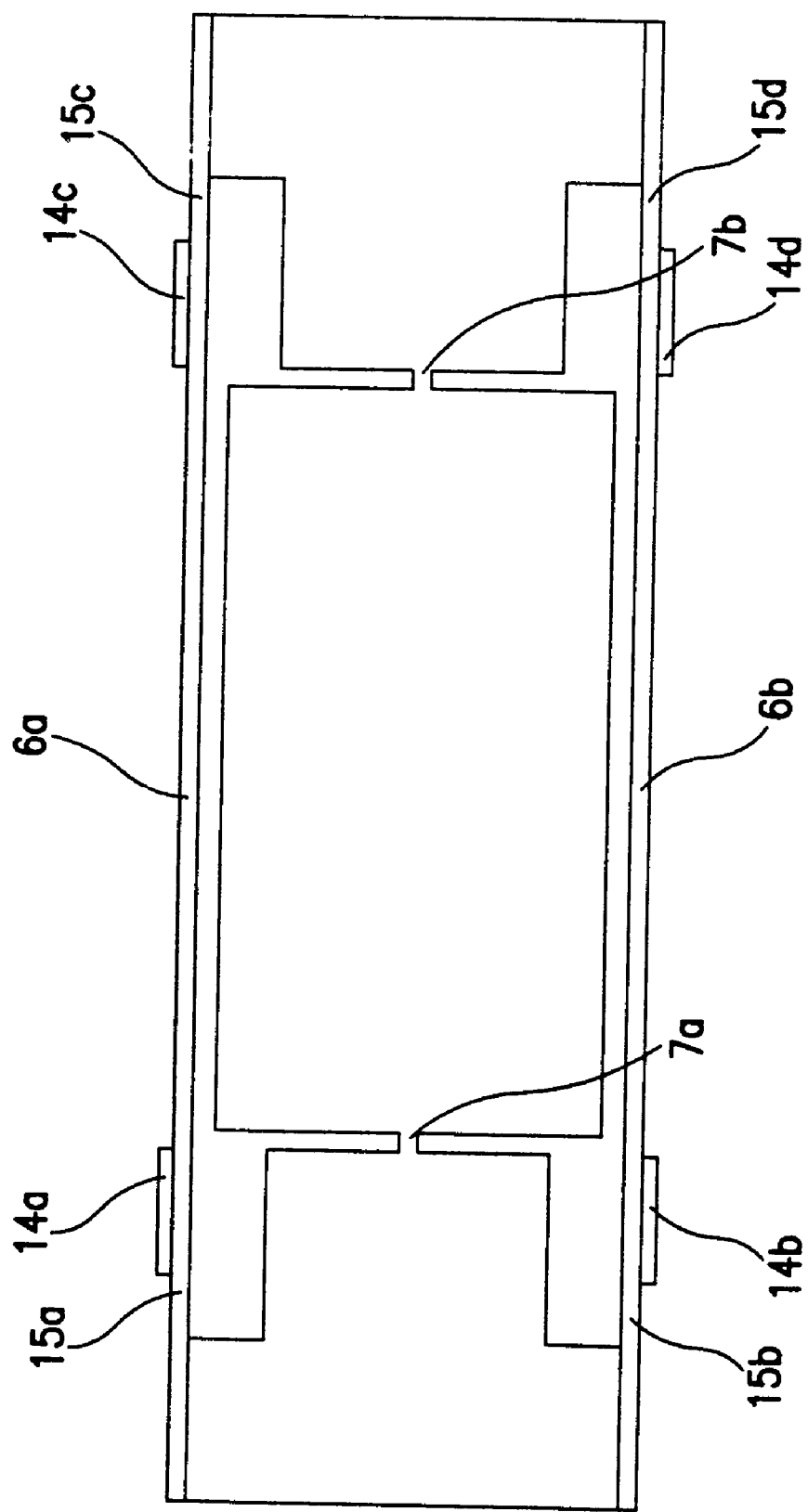
FIG. 29 is a top view showing another configuration of the seventh embodiment of this invention.

To allow the piezoelectric elements to act like the hinge mechanism on the mounted portion of the piezoelectric element that is added to the form in FIG. 28, the form in FIG. 29 has reinforcing materials 14a to 14d mounted on part of the piezoelectric element. Consequently, hinge substitution sections 15a to 15d act like the hinge mechanism to provide characteristics equivalent to those in FIG. 28.

Figure 30:
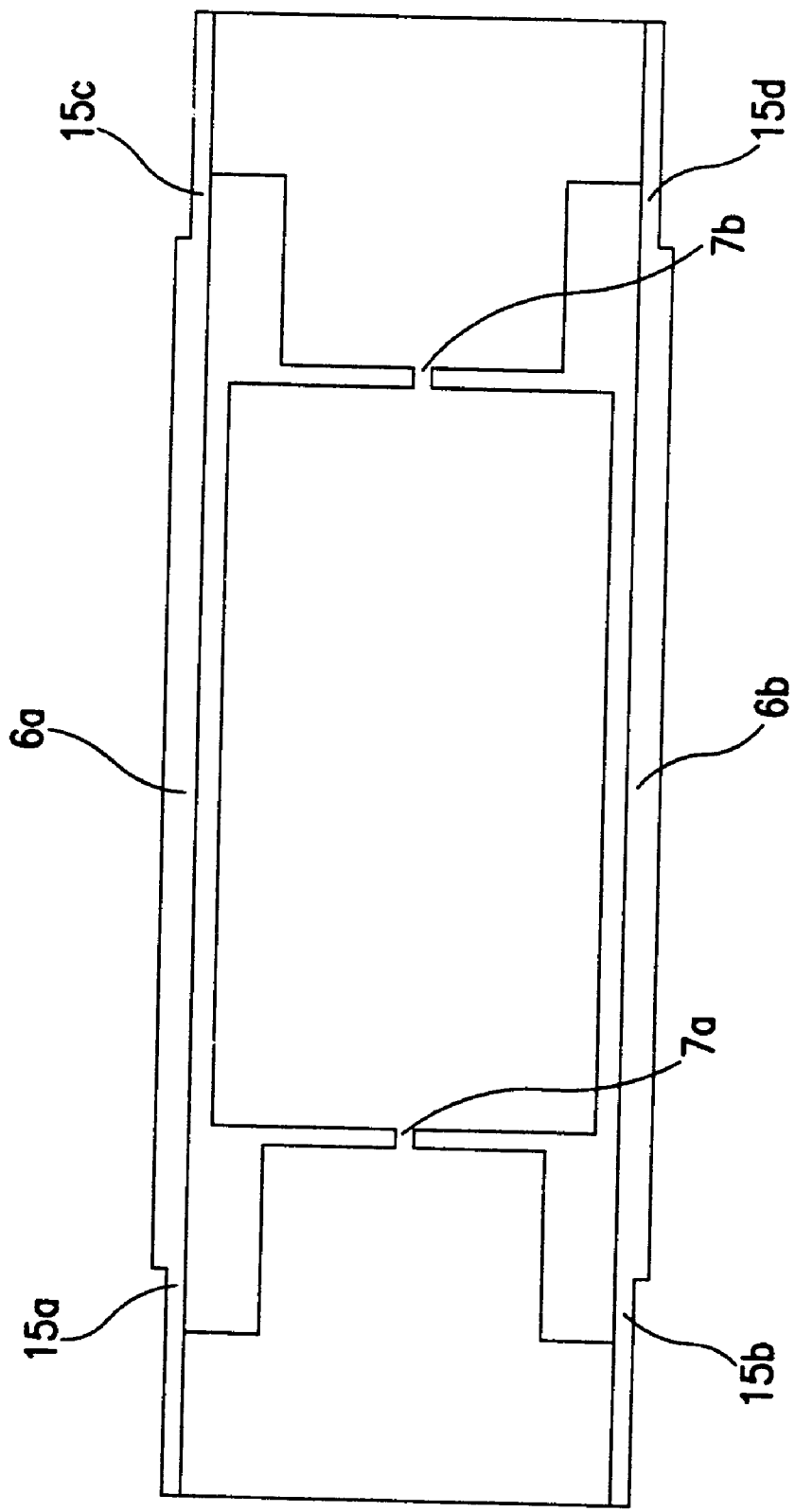
FIG. 30 is a top view showing another configuration of the seventh embodiment of this invention.

Like the form in FIG. 29, the form in FIG. 30 allows the piezoelectric elements to act like the hinge mechanism on the mounted portion of the piezoelectric element. Specifically, thin portions are formed at the respective ends of the piezoelectric element and used as the hinge substitution sections 15a to 15d. Of course, this configuration provides effects similar to those in FIG. 28.

Eighth Embodiment

An eighth embodiment of this invention is described below with reference to the drawings.

FIG. 31 is a top view of a fine-motion actuator in a head actuator mechanism according to the eighth embodiment of this invention.

In the figure, 6a and 6b are piezoelectric elements consisting of piezoelectric bodies, 13a, 13b, 13c, 13d, 13e, and 13f are body blocks consisting of elastic bodies, and 16 is a shaft plate consisting of an elastic body. According to this configuration, the body blocks 13a and 13b, the body blocks 13c and 13d, and the blocks 13e and 13f are respectively joined together in such a way as to be mutually opposed and to sandwich the shaft plate 16. The piezoelectric element 6a has its respective ends joined with the body blocks 13a and 13c, while the piezoelectric element 6b has its respective ends joined with the body blocks 13b and 13d.

Figure 32:
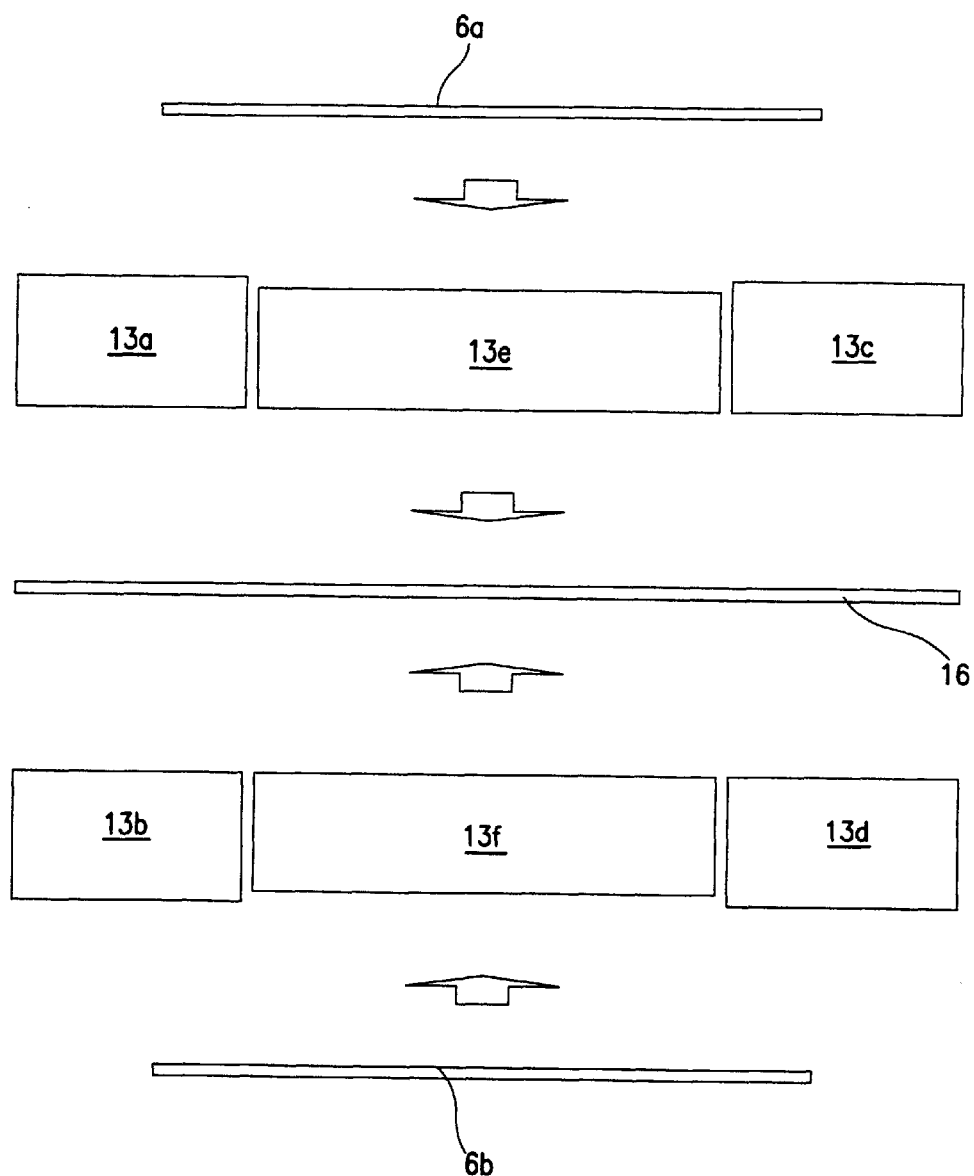
FIG. 32 describes the assembly of the eighth embodiment of this invention.

FIG. 32 shows an assembly process for this actuator structure. As shown in this figure, the actuator of this configuration is configured by combining small members together.

Besides, this assembly method is applicable to the manufacturing method for slicing actuator blocks to form actuators as shown in FIG. 25.

This configuration is similar to the configuration in the seventh embodiment (FIG. 27) and has similar operational principles and effects. Since, however, this configuration is obtained by combining several members, the shaft plate 16 can comprise a material having the nature of a spring to allow the hinge sections 7a and 7b to be formed of the plate 16 in order to improve the reliability of the hinge sections during the driving of the actuator and thus the reliability of the actuator.

In addition, the body plates 13a and 13b located on the head side can comprise a material of a small specific gravity to allow the position of the gravity of the actuator to approach the shaft section supporting the entire suspension in order to improve the resonance frequency of a head actuator, thereby improving the control frequency of the actuator at a high value. As a result, a head actuator having a higher operational speed can be realized.

Moreover, if the piezoelectric elements comprise a piezoelectric singlecrystal material, the joined portion of the body block 13 can comprise a material that can be joined with the piezoelectric singlecrystal material easily, thereby eliminating the needs for adhesion with resin that is a factor preventing precision control. As a result, a head actuator mechanism that can be more easily precision-controlled can be realized.

Ninth Embodiment

A ninth embodiment of this invention is described below with reference to the drawings.

Figure 33:
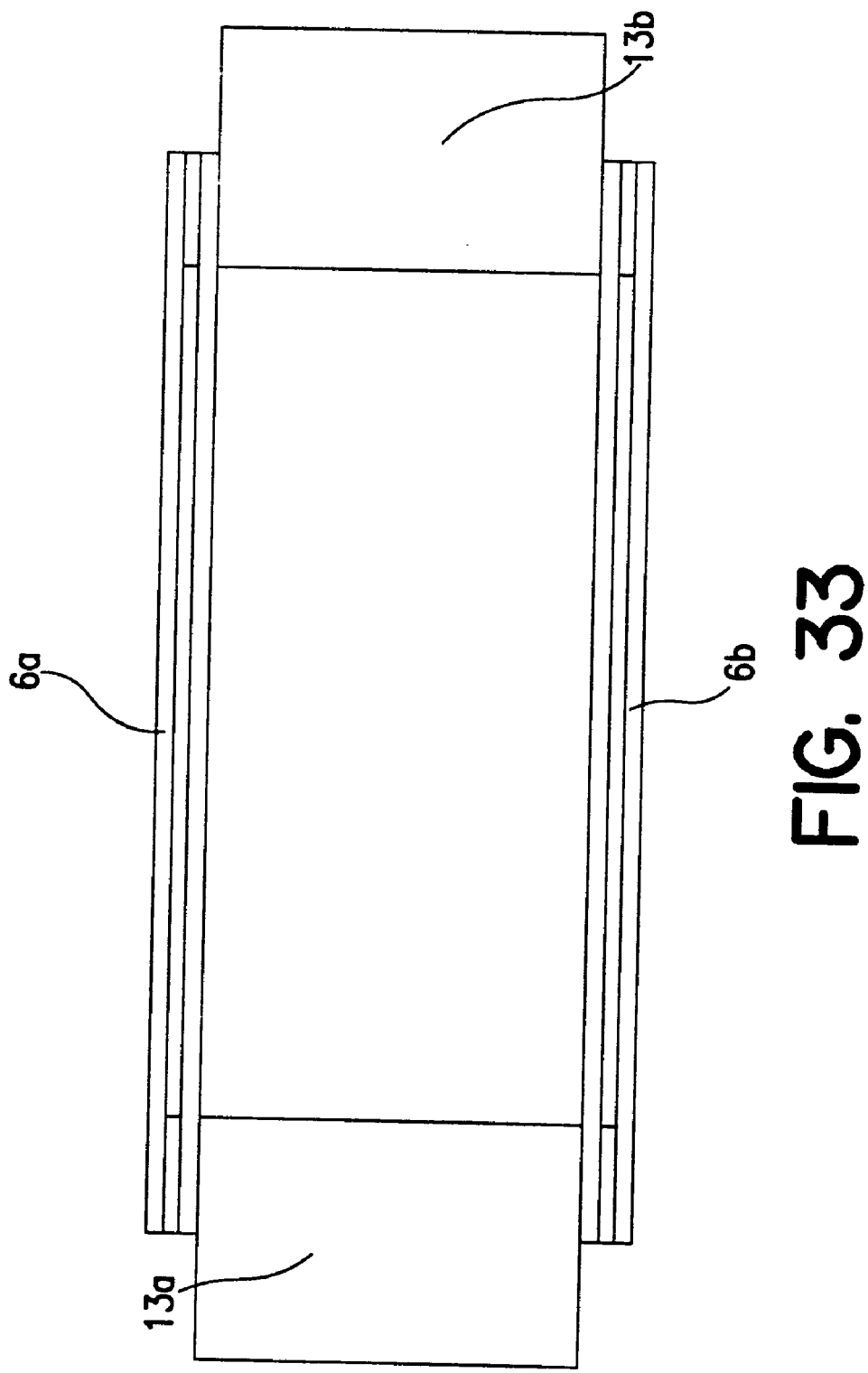
FIG. 33 is a top view showing a configuration of a ninth embodiment of this invention.

FIG. 33 is a top view of a fine-motion actuator in a head actuator mechanism according to the ninth embodiment of this invention.

Figure 27:
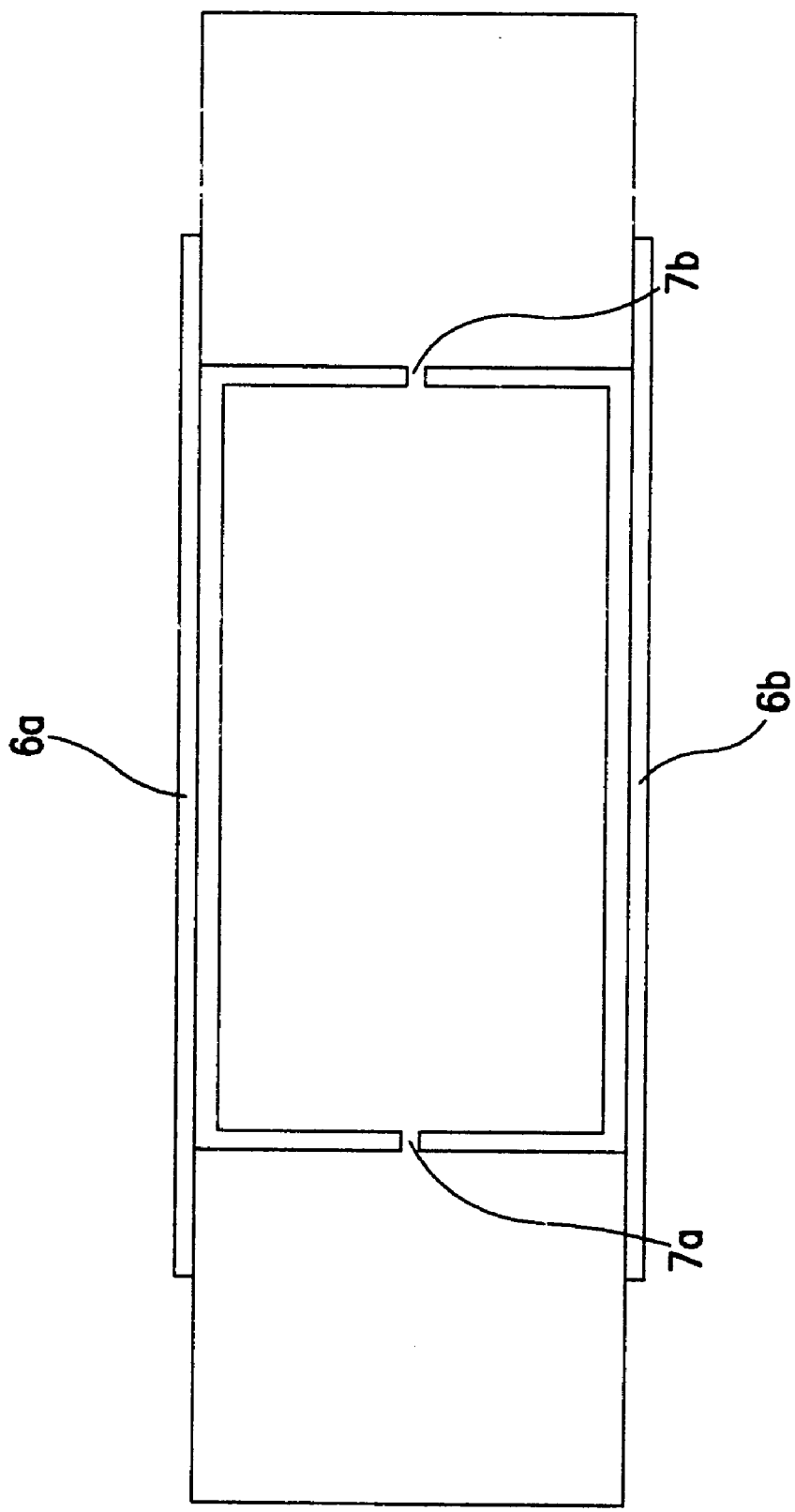
FIG. 27 is a top view showing another configuration of the seventh embodiment of this invention.

This embodiment differs from FIG. 27 showing the seventh embodiment in the configuration of the piezoelectric elements.

Figure 34:
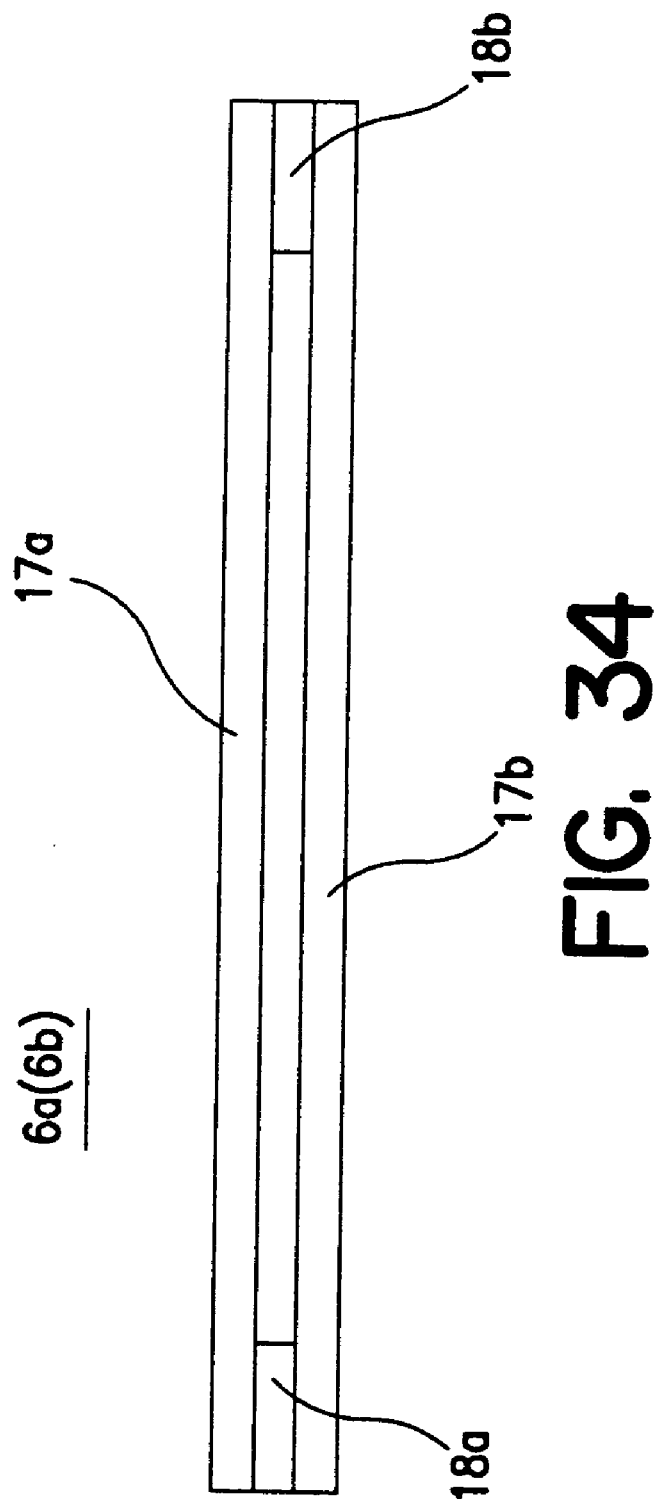
FIG. 34 is a top view showing a configuration of a piezoelectric element according to the ninth embodiment of this invention.

FIG. 34 shows a configuration of the piezoelectric element.

Piezoelectric elements 6a and 6b comprise two piezoelectric bodies 17a and 17b opposed at a predetermined distance in such a way as to sandwich joining members 18a and 18b.

Electrodes are formed in the respective surfaces of each of the piezoelectric bodies 17a and 17b, and the inter-electrode wiring and the polarization direction are determined so that the piezoelectric bodies 17a and 17b follow the same stretching-deformation process. The piezoelectric bodies 17a and 17b are connected in parallel.

This configuration can easily increase the cross section of the piezoelectric element while maintaining the drive voltage constant. Consequently, the force generated by the piezoelectric element can be increased to realize a head actuator having an increased amount of displacement. Besides, the thickness of the element increases to improve the strength of the actuator mechanism, thereby substantially improving the impact resistance.

On the contrary, by maintaining the thickness of the piezoelectric element constant, the thickness of each piezoelectric body can be reduced without changing the rigidity of the actuator. Accordingly, the drive voltage can be significantly reduced while maintaining a constant amount of displacement, thereby realizing a head actuator that enables driving with a low voltage.

The other structure is the same as in the first embodiment, so this configuration provides effects similar to those of the configuration in FIG. 1.

Figure 35:
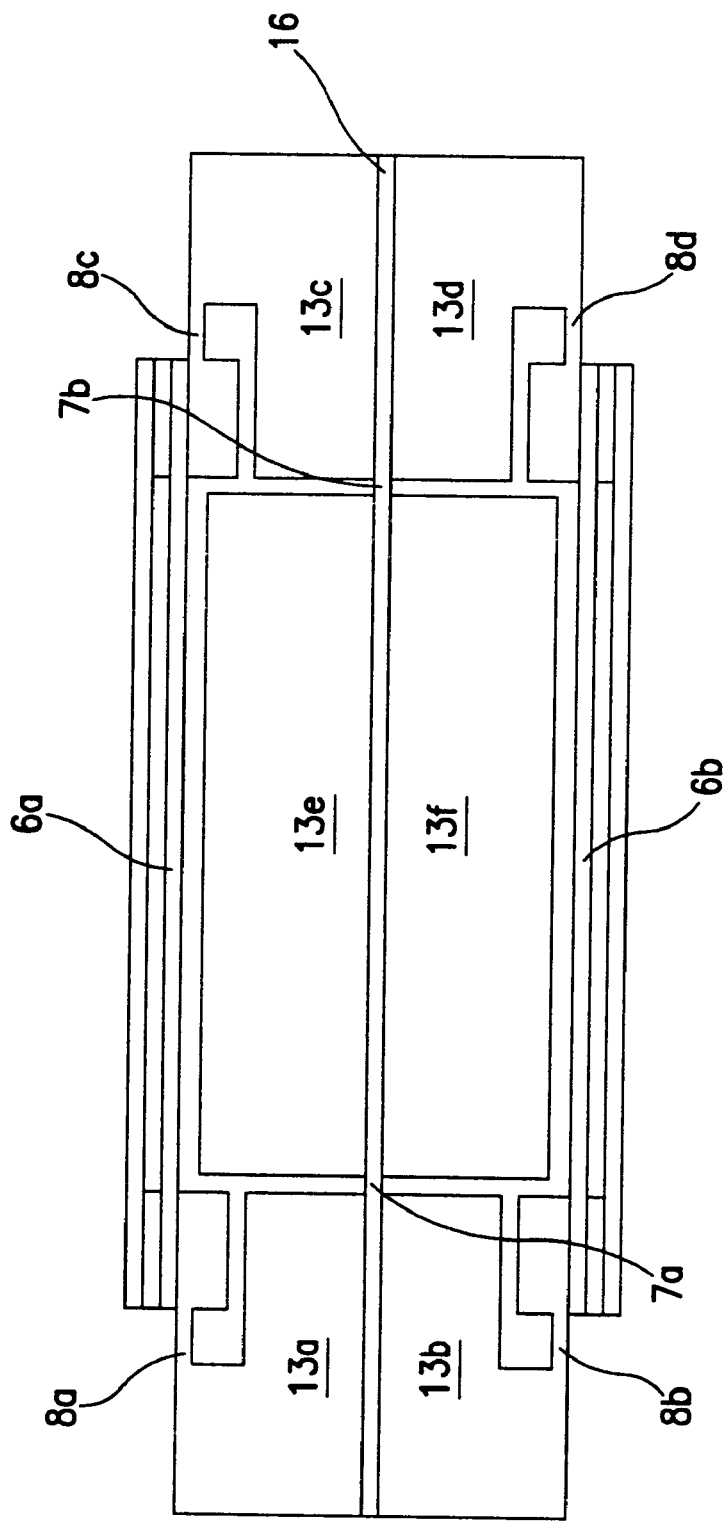
FIG. 35 is a top view showing another configuration of the ninth embodiment of this invention.
Figure 36:
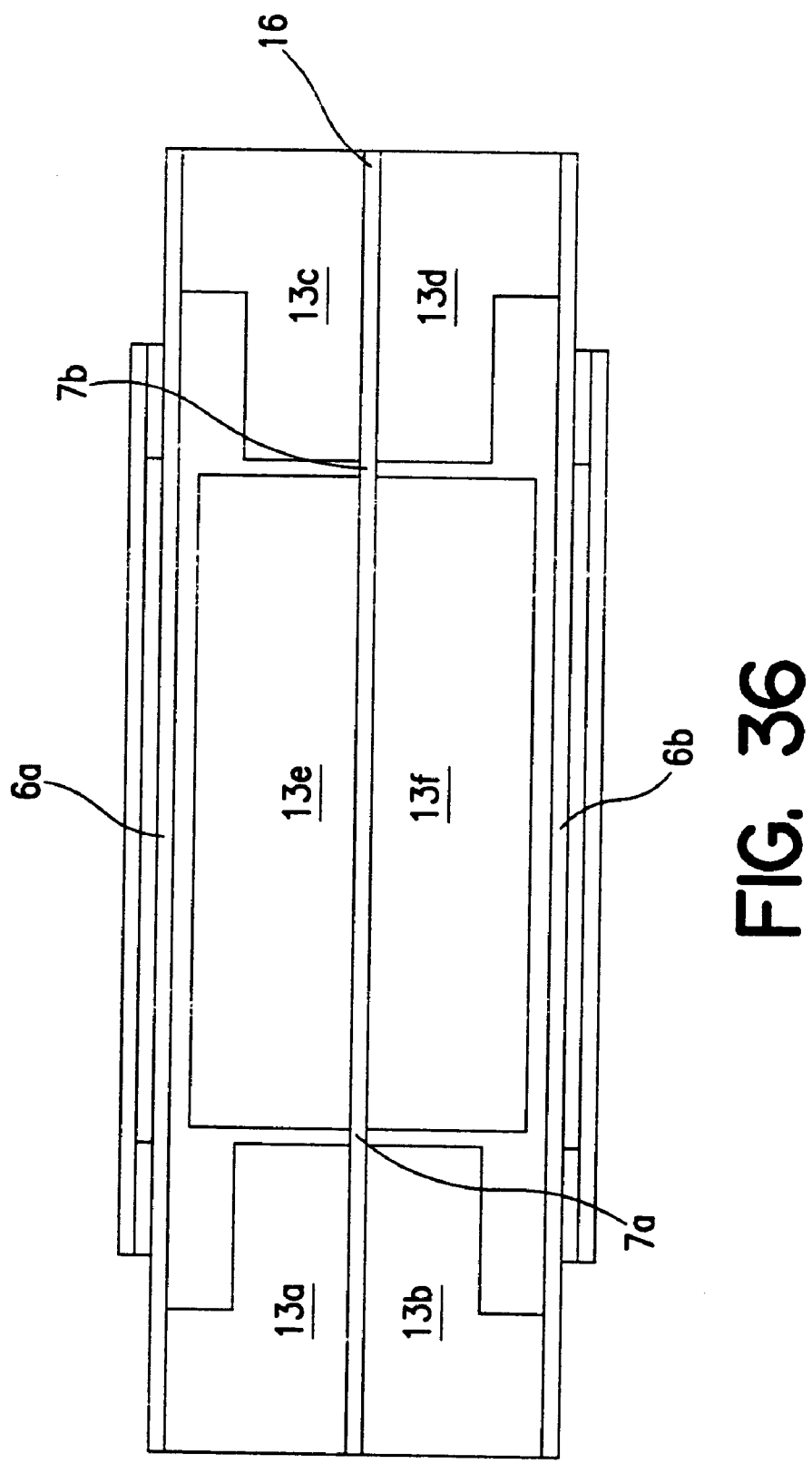
FIG. 36 is a top view showing another configuration of the ninth embodiment of this invention.

FIGS. 35 and 36 show similar piezoelectric elements applied to other configurations of Embodiment 7, and of course, these elements provide both the above effects and the effects described in Embodiment 7. FIG. 35 shows an application to FIG. 28 and FIG. 36 shows an application to FIG. 29.

Although these piezoelectric elements are laminated using joining members, similar effects can be obtained using laminated piezoelectric elements each comprising piezoelectric bodies that are simply stuck together.

In addition, if a piezoelectric singlecrystal material is used as piezoelectric bodies having electrodes on their surfaces, it is normally difficult to directly join these piezoelectric bodies together. According to the configuration of the present piezoelectric element, however, the piezoelectric bodies can be joined together easily by avoiding providing electrodes in the junctions between the joining members and the piezoelectric bodies. Consequently, the characteristics of the piezoelectric singlecrystal material can be fully provided. In addition, it is difficult to directly join different types of piezoelectric singlecrystal materials together due to a releasing phenomenon caused by the difference in thermal expansion coefficient, but this releasing problem during junction can be solved by forming the joining members of the same singlecrystal material as the piezoelectric bodies.

Figure 37:
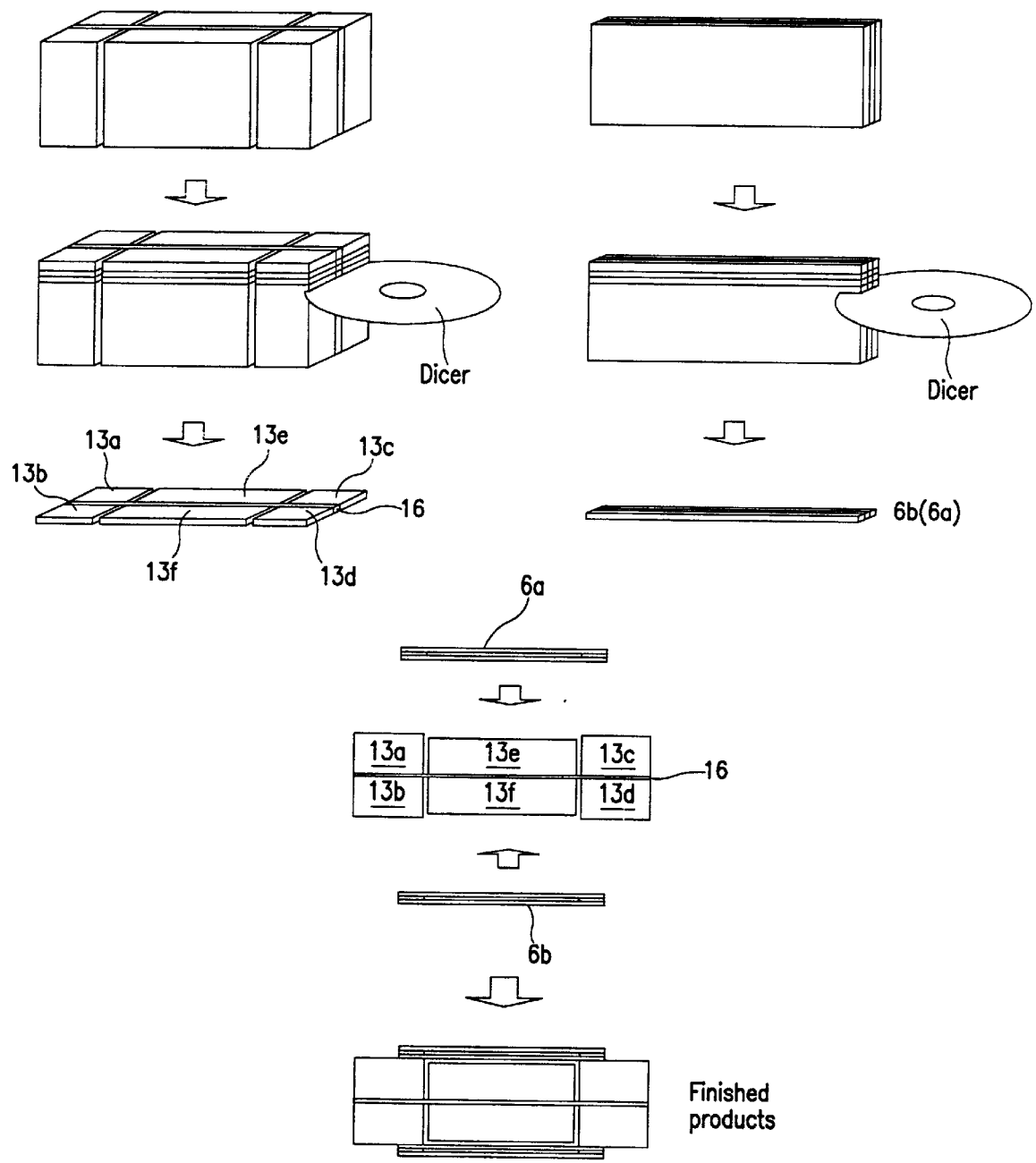
FIG. 37 shows a method for manufacturing the ninth embodiment of this invention.

FIG. 37 shows an example of a method for manufacturing the present actuator. This manufacturing method constructs the actuator by joining together members into which two blocks have been cut. A block for an actuator mechanism section (composed of 13a to 13f and 16) is first produced and sliced into pieces of an appropriate size using a processing machine such as a dicer in order to form the actuator mechanism section. Furthermore, a block is produced that comprises piezoelectric bodies 17a and 17b that are sufficiently large in the direction of its width and that are jointed together using similar joining members 18a and 18b. This block is similarly sliced to form piezoelectric elements 6a and 6b. Finally, these members are joined together at predetermined positions to obtain finished products.

This manufacturing method enables a large number of actuators to be manufactured relatively inexpensively.

Tenth Embodiment

A tenth embodiment of this invention is described below with reference to the drawings.

Figure 38:
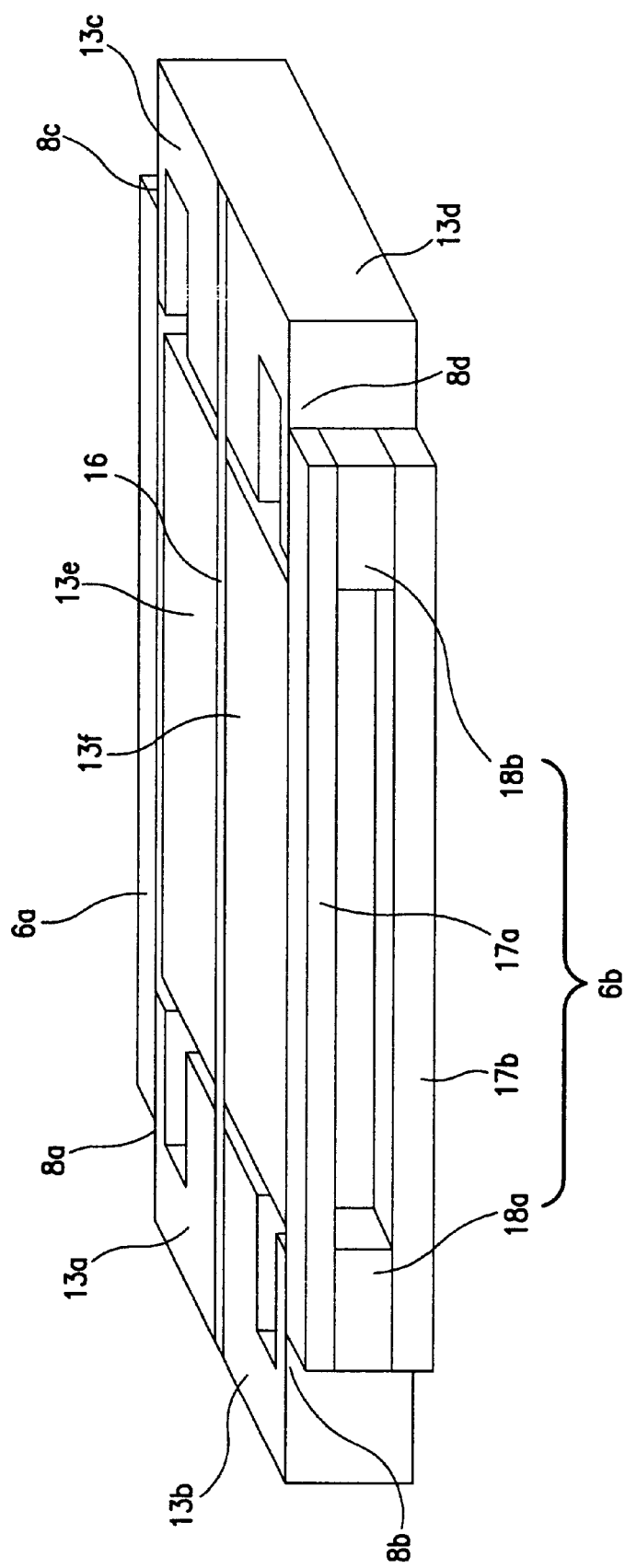
FIG. 38 is a top view showing a configuration of a tenth embodiment of this invention.

FIG. 38 is a perspective view of a head actuator mechanism according to the tenth embodiment of this invention.

In the figure, 6a and 6b are piezoelectric elements formed by joining piezoelectric bodies 17a and 17b in such a way as to sandwich joining members 18a and 18b; 13a, 13b, 13c, 13d, 13e, and 13f are body blocks consisting of elastic bodies; and 16 is a shaft plate consisting of an elastic body. According to this configuration, the body blocks 13a and 13b, the body blocks 13c and 13d, and the blocks 13e and 13f are respectively joined together in such a way as to be mutually opposed and to sandwich the shaft plate 16. The piezoelectric element 6a has its respective ends joined with the body blocks 13a and 13c, while the piezoelectric element 6b has its respective ends joined with the body blocks 13b and 13d. Furthermore, hinge sections 8a to 8d are formed between the piezoelectric element 6a and the body blocks 13a and 13c and between the piezoelectric element 6b and the body blocks 13b and 13d.

This configuration can easily increase the cross section of the piezoelectric element while maintaining the drive voltage constant. Consequently, the force generated by the piezoelectric element can be increased to realize a head actuator having an increased amount of displacement. Besides, the thickness of the element increases to improve the strength of the actuator mechanism, thereby substantially improving the impact resistance.

On the contrary, by maintaining the thickness of the piezoelectric element constant, the thickness of each piezoelectric body can be reduced without changing the rigidity of the actuator. Accordingly, the drive voltage can be significantly reduced while maintaining a constant amount of displacement, thereby realizing a head actuator that enables driving with a low voltage.

This configuration has operational principles and effects similar to those of the eighth embodiment. This embodiment, however, further enables the rigidity in the head moving direction to be determined by the Young's modulus and width of the piezoelectric element, thereby enabling the resonance frequency of vibration in the moving direction to be set at a high value to increase the control frequency for the actuator. As a result, a head actuator capable of fast operations can be realized.

Figure 39:
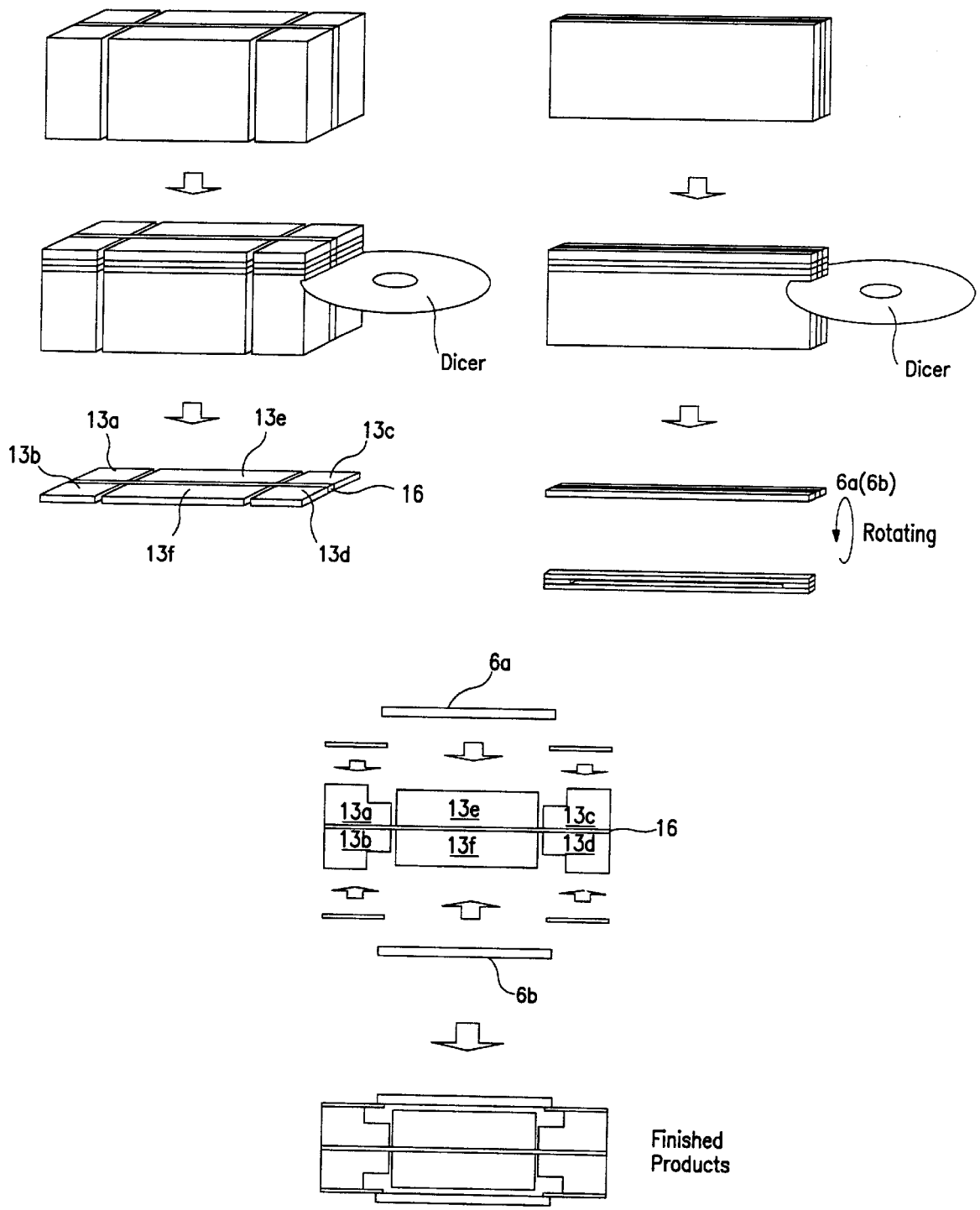
FIG. 39 shows a method for manufacturing the tenth embodiment of this invention.
Figure 40:
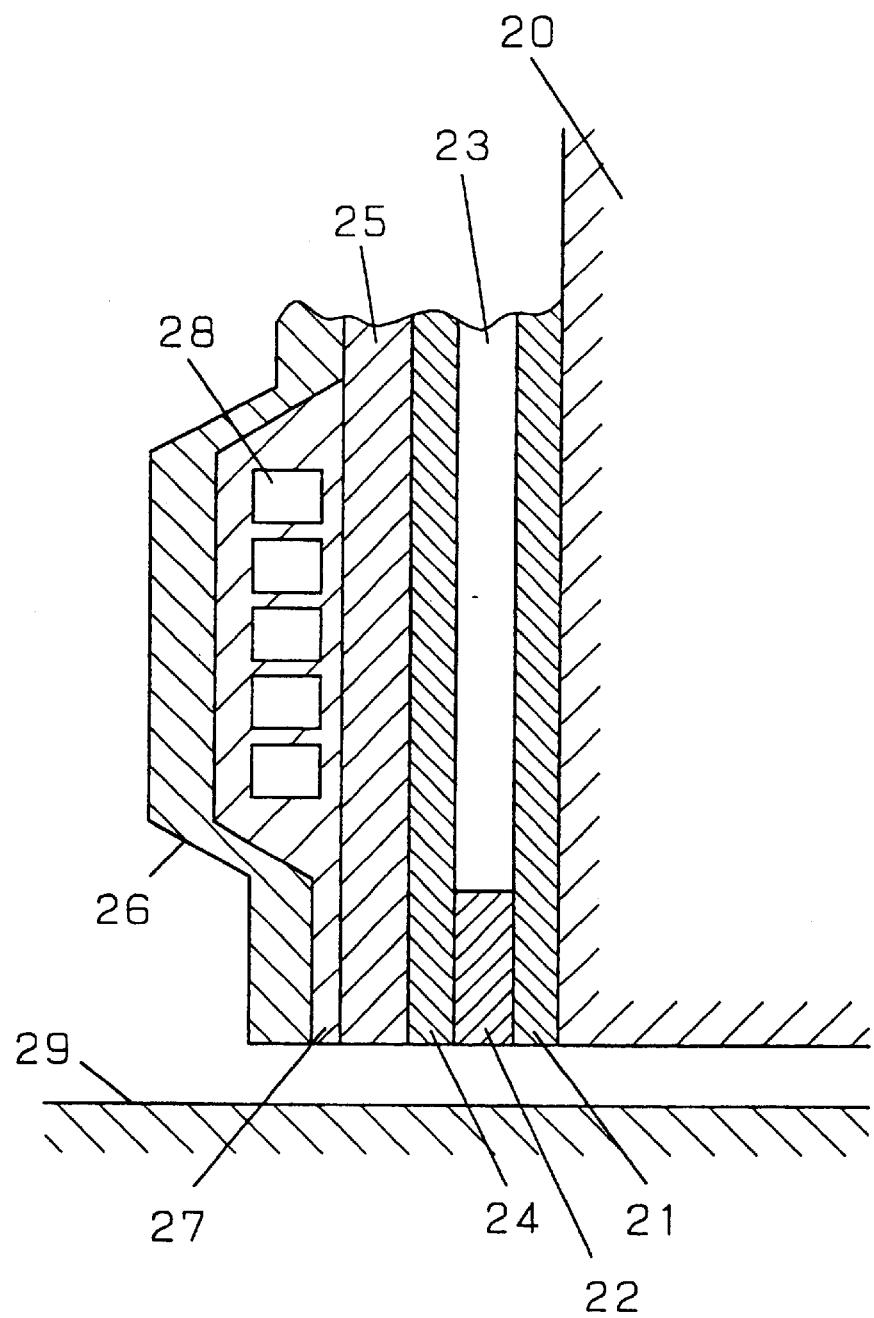
FIG. 40 is a sectional view showing a magnetic head comprising a write and a read elements integrated together.
Figure 41:
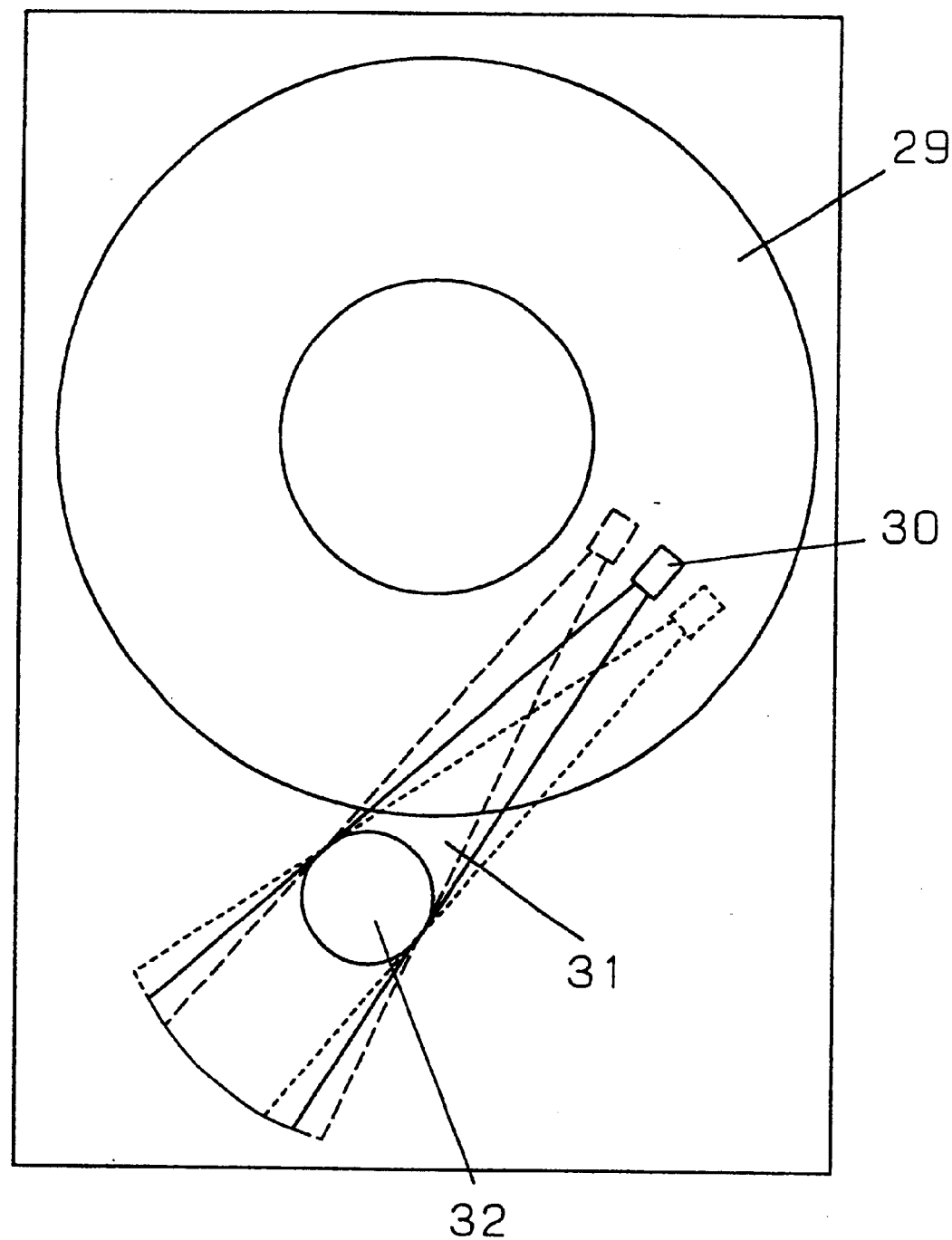
FIG. 41 is an explanatory drawing of a rotary actuator in a magnetic disc apparatus.
Figure 42A:
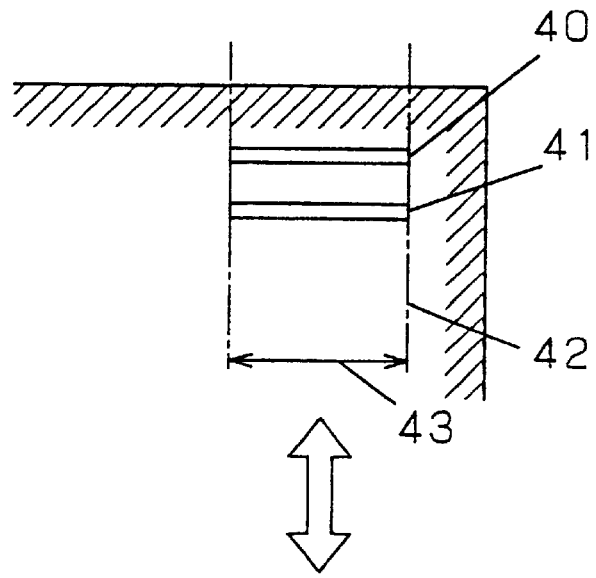
FIG. 42 describes a track direction and a track offset between a write and a read caused by the variation of the relative angle of a magnetic head according to the prior art.
Figure 42B:
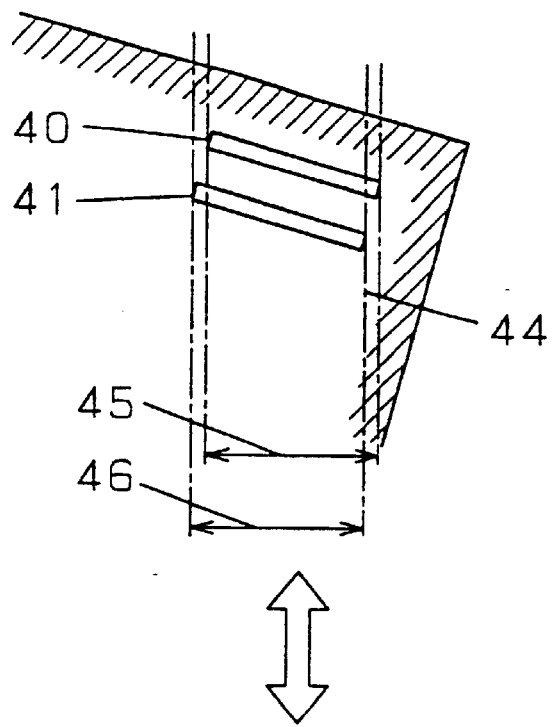

FIG. 39 shows an example of a method for manufacturing the present actuator. This manufacturing method constructs the actuator by joining together members into which two blocks have been cut. A block for an actuator mechanism section (composed of 13a to 13f and 16) is first produced and sliced into pieces of an appropriate size using a processing machine such as a dicer in order to form the actuator mechanism section. Furthermore, a block is produced that comprises piezoelectric bodies 17a and 17b that are sufficiently large in the direction of its width and that are jointed together using similar joining members 18a and 18b. This block is similarly sliced to form piezoelectric elements 6a and 6b. Finally, these members are joined with the thin plates serving as the hinge substitution sections 8a and to 8d together at predetermined positions to obtain finished products.

This manufacturing method enables a large number of actuators to be manufactured relatively inexpensively.

Of course, if a piezoelectric singlecrystal material is used as piezoelectric elements, not only the above effects but also the effects described in Embodiment 8 can be obtained.

Although the above embodiments have been described in conjunction with the head actuator mechanism of a rotary moving type, this invention is applicable to a linear moving type.

As described above, this invention uses the stretching vibration of the group of piezoelectric elements provided between the suspension and support arm in order to enable the fine motion of the head attached to the tip of the suspension.

This configuration eliminates track offsets between writes and reads to prevent the read output from decreasing depending on the position of the track, thereby providing a reliable magnetic disc.

What is claimed is:

1. A head actuator mechanism comprising:
   a head that records and reproduces data;
   a suspension that holds the head;
   a support arm;
   the support arm and the suspension each forming a first and second opposing and longitudinally extending outer walls;
   drive means for moving the support arm; and
   a coupling section including two spaced apart piezoelectric elements coupled between the suspension and the support arm-each piezoelectric element defining a respective portion of the first and second outer walls and
   the support arm and the suspension being separate from each other and coupled together only by the two piezoelectric elements.

2. A head actuator mechanism according to claim 1 wherein one of said piezoelectric elements includes both ends fixed to said support arm and said suspension.

3. A head actuator mechanism according to claim 2, wherein a hinge section is provided on a part of said one piezoelectric element or suspension between said one piezoelectric element and said suspension.

4. A head actuator mechanism according to claim 2, wherein a hinge section is provided on a part of said one piezoelectric element or said support arm between said one piezoelectric element and said support arm.

5. A head actuator according to claim 2, wherein said one piezoelectric element is shaped like a plate that is parallel with or perpendicular to a surface of a disc for recording or reproduction.

6. A head actuator according to claim 2, wherein said one piezoelectric element is composed of two plate-like piezoelectric element members spaced at a predetermined interval.

7. A head actuator according to claim 2, wherein said coupling section is composed of a member different from that of which said support arm and said suspension are composed.

8. A head actuator according to claim 7, wherein:
   said coupling section is composed of part of a long member, in that:
   said support arm has a support arm mounted portion on its side on which it is coupled to said piezoelectric element, in that:
   said suspension has a suspension mounted portion on its side on which it is coupled to said piezoelectric element, in that:
   said support arm mounted portion and said suspension mounted portion are each divided into two blocks, and in that:
   said divided support arm mounted portion blocks and said divided suspension mounted portion blocks are respectively fixed to the respective sides of said long member except for said coupling section.

9. A head actuator according to claim 2, wherein a detective electrode is provided on said one piezoelectric element and used to compensate for creep displacement.

10. A head actuator according to claim 2, wherein a plurality of suspensions and heads are mounted on said one piezoelectric element.

11. A head actuator according to claim 2, wherein a material of said one piezoelectric element comprises one of a piezoelectric singlecrystal material and a piezoelectric ceramic material.

12. A method for manufacturing a head actuator according to claim 2 in which said support arm has a support arm body section and a mounted portion with which it is mounted on said piezoelectric element and in which said suspension has a suspension body section and a mounted portion with which it is mounted on said piezoelectric element, wherein
   a plurality of said head actuators are manufactured by coupling and integrating together a support arm brock corresponding to the mounted portion of said support arm and a suspension block corresponding to the mounted portion of said suspension via a plate-like piezoelectric element block corresponding to said piezoelectric element, slicing the blocks to produce a plurality of integrated bodies each consisting of said support arm mounted portion, piezoelectric element, and suspension mounted portion, joining the support arm mounted portion with said support arm body section, and joining said suspension mounted portion with said suspension body section.

13. A head actuator mechanism according to claim 1, wherein said coupling section is present on a side at which one of said piezoelectric elements is coupled to said support arm.

14. A head actuator mechanism according to claim 13, wherein said coupling section is also present on another side at which said one piezoelectric element is coupled to said suspension.

15. A head actuator mechanism according to claim 13, wherein a hinge section is provided on a part of said one piezoelectric element or said support arm between said one piezoelectric element and said support arm.

16. A head actuator according to claim 13, wherein said one piezoelectric element is shaped like a plate that is parallel with or perpendicular to a surface of a disc for recording or reproduction.

17. A head actuator according to claim 13, wherein said one piezoelectric element is composed of two plate-like piezoelectric element members spaced at a predetermined interval.

18. A head actuator according to claim 13, wherein said coupling section is composed of a member different from that of which said support arm and said suspension are composed.

19. A head actuator according to claim 18, wherein:
said coupling section is composed of part of a long member, in that:
said support arm has a support arm mounted portion on its side on which it is coupled to said piezoelectric element, in that:
said suspension has a suspension mounted portion on its side on which it is coupled to said piezoelectric element, in that:
said support arm mounted portion and said suspension mounted portion are each divided into two blocks, and in that:
said divided support arm mounted portion blocks and said divided suspension mounted portion blocks are respectively fixed to the respective sides of said long member except for said coupling section.

20. A head actuator according to claim 13, wherein a detective electrode is provided on said one piezoelectric element and used to compensate for creep displacement.

21. A head actuator according to claim 13, wherein a plurality of suspensions and heads are mounted on said one piezoelectric element.

22. A head actuator according to claim 13, wherein a material of said one piezoelectric element comprises one of a piezoelectric singlecrystal material and a piezoelectric ceramic material.

23. A method for manufacturing a head actuator according to claim 13 which said support arm has a support arm body section and a mounted portion with which it is mounted on said piezoelectric element and in which said suspension has a suspension body section and a mounted portion with which it is mounted on said piezoelectric element, wherein
a plurality of said head actuators are manufactured by coupling and integrating together a support arm block corresponding to the mounted portion of said support arm and a suspension block corresponding to the mounted portion of said suspension via a plate-like piezoelectric element block corresponding to said piezoelectric element, slicing the blocks to produce a plurality of integrated bodies each consisting of said support arm mounted portion, piezoelectric element, and suspension mounted portion, joining the support arm mounted portion with said support arm body section, and joining said suspension mounted portion with said suspension body section.

24. A head actuator mechanism according to claim 13, wherein a hinge section is provided on a part of said one piezoelectric element or suspension between said one piezoelectric element and said suspension.

25. A head actuator mechanism according to claim 1, wherein said coupling section is present on a side at which one of said piezoelectric elements is coupled to said suspension.

26. A head actuator mechanism according to claim 25, wherein a hinge section is provided on a part of said one piezoelectric element or suspension between said one piezoelectric element and said suspension.

27. A head actuator mechanism according to claim 25, wherein a hinge section is provided on a part of said one piezoelectric element or said support arm between said one piezoelectric element and said support arm.

28. A head actuator according to claim 25, wherein said one piezoelectric element is shaped like a plate that is parallel with or perpendicular to a surface of a disc for recording or reproduction.

29. A head actuator according to claim 25, wherein said coupling section is composed of a member different from that of which said support arm and said suspension are composed.

30. A head actuator according to claim 29, wherein:
said coupling section is composed of part of a long member, in that:
said support arm has a support arm mounted portion on its side on which it is coupled to said piezoelectric element, in that:
said suspension has a suspension mounted portion on its side on which it is coupled to said piezoelectric element, in that:
said support arm mounted portion and said suspension mounted portion are each divided into two blocks, and in that:
said divided support arm mounted portion blocks and said divided suspension mounted portion blocks are respectively fixed to the respective sides of said long member except for said coupling section.

31. A head actuator according to claim 25, wherein said one piezoelectric element is composed of two plate-like piezoelectric element members spaced at a predetermined interval.

32. A head actuator according to claim 25, wherein a detective electrode is provided on said one piezoelectric element and used to compensate for creep displacement.

33. A head actuator according to claim 25, wherein a plurality of suspensions and heads are mounted on said one piezoelectric element.

34. A head actuator according to claim 25, wherein a material of said one piezoelectric element comprises one of a piezoelectric singlecrystal material and a piezoelectric ceramic material.

35. A method for manufacturing a head actuator according to claim 25 in which said support arm has a support arm body section and a mounted portion with which it is mounted on said piezoelectric element and in which said suspension has a suspension body section and a mounted portion with which it is mounted on said piezoelectric element, wherein a plurality of said head actuators are manufactured by coupling and integrating together a support arm brock corresponding to the mounted portion of said support arm and a suspension block corresponding to the mounted portion of said suspension via a plate-like piezoelectric element block corresponding to said piezoelectric element, slicing the blocks to produce a plurality of integrated bodies each consisting of said support arm mounted portion, piezoelectric element, and suspension mounted portion, joining the support arm mounted portion with said support arm body section, and joining said suspension mounted portion with said suspension body section.

36. A head actuator mechanism according to claim 1, wherein a hinge section is provided on a part of one of said piezoelectric elements or suspension between said one piezoelectric element and said suspension.

37. A head actuator mechanism according to claim 36, wherein said hinge section is formed on the part of said one piezoelectric element by making the part thinner.

38. A head actuator mechanism according to claim 36, wherein if said hinge section is formed on the part of said one piezoelectric element a hard portion is present near the hinge section.

39. A head actuator mechanism according to claim 1, wherein a hinge section is provided on a part of one of said piezoelectric elements or said support arm between said one piezoelectric element and said support arm.

40. A head actuator mechanism according to claim 39, wherein said hinge section is formed on the part of said one piezoelectric element by making the part thinner.

41. A head actuator mechanism according to claim 39, wherein if said hinge section is formed on the part of said one piezoelectric element a hard portion is present near the hinge section.

42. A head actuator according to claim 1, wherein one of said piezoelectric elements is shaped like a plate that is parallel with or perpendicular to a surface of a disc for recording or reproduction.

43. A head actuator according to claim 1, wherein one of said piezoelectric elements is composed of two plate-like piezoelectric element members spaced at a predetermined interval.

44. A head actuator according to claim 1, wherein said coupling section is composed of a member different from that of which said support arm and said suspension are composed.

45. A head actuator according to claim 44, wherein:

said coupling section is composed of part of a long member, in that:

said support arm has a support arm mounted portion on its side on which it is coupled to said piezoelectric element, in that:

said suspension has a suspension mounted portion on its side on which it is coupled to said piezoelectric element, in that:

said support arm mounted portion and said suspension mounted portion are each divided into two blocks, and in that:

said divided support arm mounted portion blocks and said divided suspension mounted portion blocks are respectively fixed to the respective sides of said long member except for said coupling section.

46. A method for manufacturing a head actuator according to claim 1 in which said support arm has a support arm body section and a mounted portion with which it is mounted on said piezoelectric element and in which said suspension has a suspension body section and a mounted portion with which it is mounted on said piezoelectric element, wherein a plurality of said head actuators are manufactured by coupling and integrating together a support arm brock corresponding to the mounted portion of said support arm and a suspension block corresponding to the mounted portion of said suspension via a plate-like piezoelectric element block corresponding to said piezoelectric element, slicing the blocks to produce a plurality of integrated bodies each consisting of said support arm mounted portion, piezoelectric element, and suspension mounted portion, joining the support arm mounted portion with said support arm body section, and joining said suspension mounted portion with said suspension body section.

47. A head actuator according to claim 1, wherein a detective electrode is provided on one of said piezoelectric elements and used to compensate for creep displacement.

48. A head actuator according to claim 1, wherein a plurality of suspensions and heads are mounted on one of said piezoelectric elements.

49. A head actuator according to claim 1, wherein a material of one of said piezoelectric elements comprises one of a piezoelectric singlecrystal material and a piezoelectric ceramic material.

50. A method for manufacturing a head actuator having a head supported by a suspension coupled to a support arm and a drive for moving the support arm, the method comprising the steps of:

(a) separately forming the support arm and suspension with first and second opposing and longitudinally extending outer walls; and (b) coupling the suspension and the support arm only by way of two spaced apart piezoelectric elements, whereby each piezoelectric element defines a respective portion of the first and second outer walls.

* * * * *